United States Patent
Agrawal et al.

(10) Patent No.: US 12,032,789 B1
(45) Date of Patent: Jul. 9, 2024

(54) EXTENDABLE ELECTRONIC DEVICE THAT MITIGATES INADVERTENT TOUCH INPUT DURING MOVEMENT OF A FLEXIBLE DISPLAY

(71) Applicant: MOTOROLA MOBILITY LLC, Wilmington, DE (US)

(72) Inventors: Amit Kumar Agrawal, Bangalore (IN); Amal Chandran, Bengaluru (IN); Maoyuan Wu, Xiamen (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/457,414

(22) Filed: Aug. 29, 2023

Related U.S. Application Data

(63) Continuation of application No. PCT/CN2023/111581, filed on Aug. 7, 2023.

(51) Int. Cl.
  *G06F 3/041* (2006.01)
  *G06F 1/16* (2006.01)
  *G09G 3/00* (2006.01)

(52) U.S. Cl.
  CPC ........ *G06F 3/04186* (2019.05); *G06F 1/1624* (2013.01); *G06F 1/1652* (2013.01); *G09G 3/035* (2020.08); *G06F 2203/04102* (2013.01); *G09G 2340/04* (2013.01); *G09G 2354/00* (2013.01)

(58) Field of Classification Search
  CPC .. G06F 3/04186; G06F 1/1624; G06F 1/1652; G06F 2203/04102; G09G 3/035; G09G 2340/04; G09G 2354/00
  See application file for complete search history.

(56) References Cited

U.S. PATENT DOCUMENTS

| | | | |
|---|---|---|---|
| 2020/0264657 A1 | 8/2020 | Lee et al. | |
| 2021/0397319 A1* | 12/2021 | Li | H10K 77/111 |
| 2021/0397339 A1* | 12/2021 | Zhang | G06F 3/04845 |
| 2021/0397395 A1* | 12/2021 | Koo | G06F 1/1609 |
| 2021/0397814 A1* | 12/2021 | Choi | G06V 40/1365 |
| 2021/0398485 A1* | 12/2021 | Park | G01K 3/005 |
| 2023/0027714 A1 | 1/2023 | Lee et al. | |

FOREIGN PATENT DOCUMENTS

| | | |
|---|---|---|
| CN | 113778252 A | 12/2021 |
| WO | 2021057699 A1 | 4/2021 |
| WO | 2021223560 A1 | 11/2021 |

OTHER PUBLICATIONS

International Search Report and Written Opinion, Patent Cooperation Treaty, International Application No. PCT/CN2023/111581, Jan. 2, 2024.

* cited by examiner

*Primary Examiner* — Sejoon Ahn
(74) *Attorney, Agent, or Firm* — Isidore PLLC

(57) ABSTRACT

An electronic device, a method and a computer program product mitigate inadvertent touch activations of a translating flexible display of the electronic device by maintaining presentation of a user interface content on a visual output layer of the flexible display in a smaller sized user interface (i.e., retracted user interface) among first and second user interfaces during repositioning of the flexible display. Association is maintained for interface control(s) at the touch input layer that correspond to the user interface content to avoid refreshing of the user interface content and thereby to mitigate inadvertent touch activation of a user interface control during the repositioning of the flexible display.

20 Claims, 15 Drawing Sheets

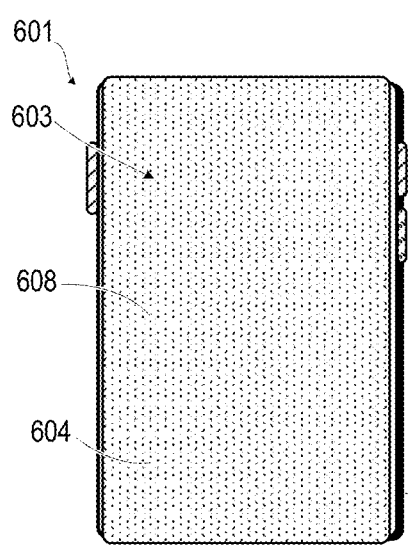 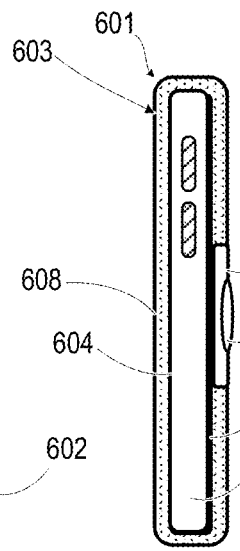 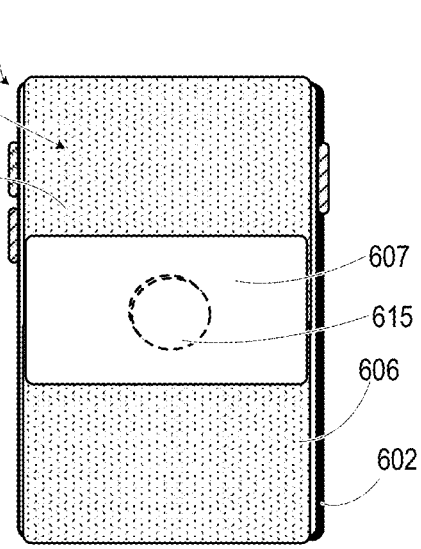
*FIG. 6A*  *FIG. 6B*  *FIG. 6C*
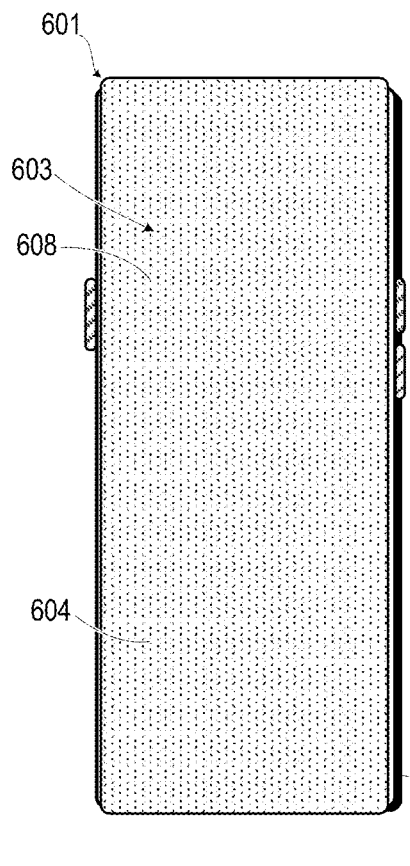 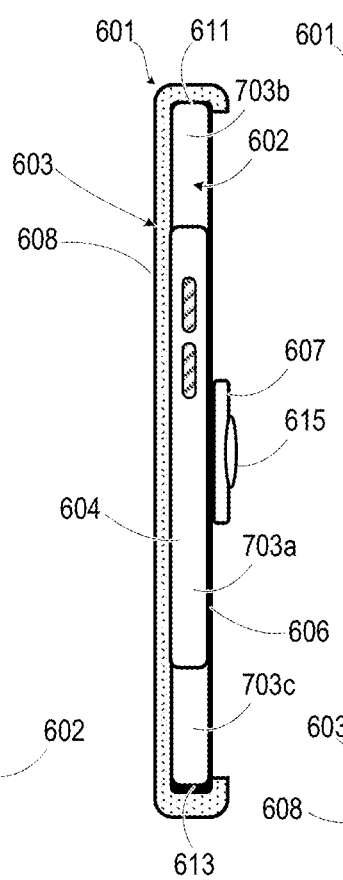 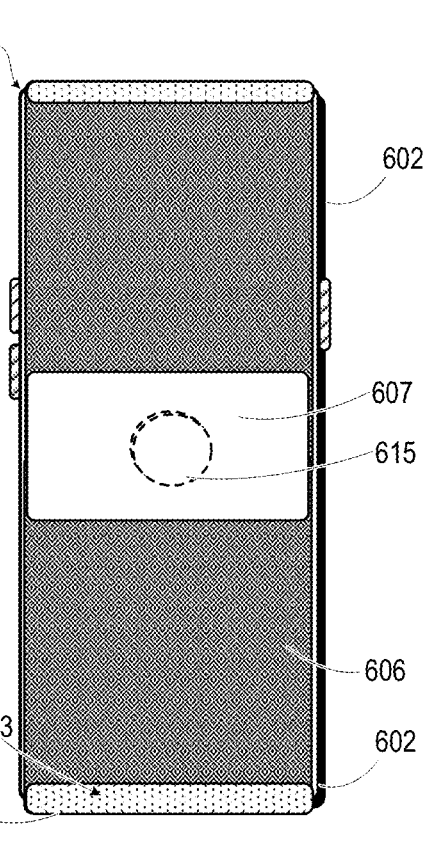
*FIG. 7A*  *FIG. 7B*  *FIG. 7C*

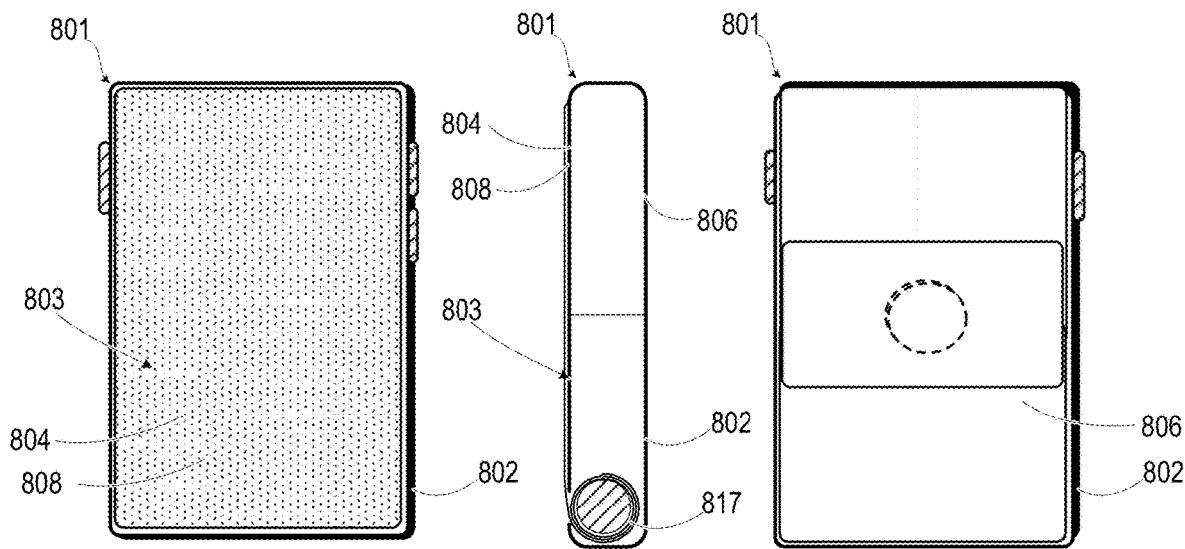
FIG. 8A   FIG. 8B   FIG. 8C
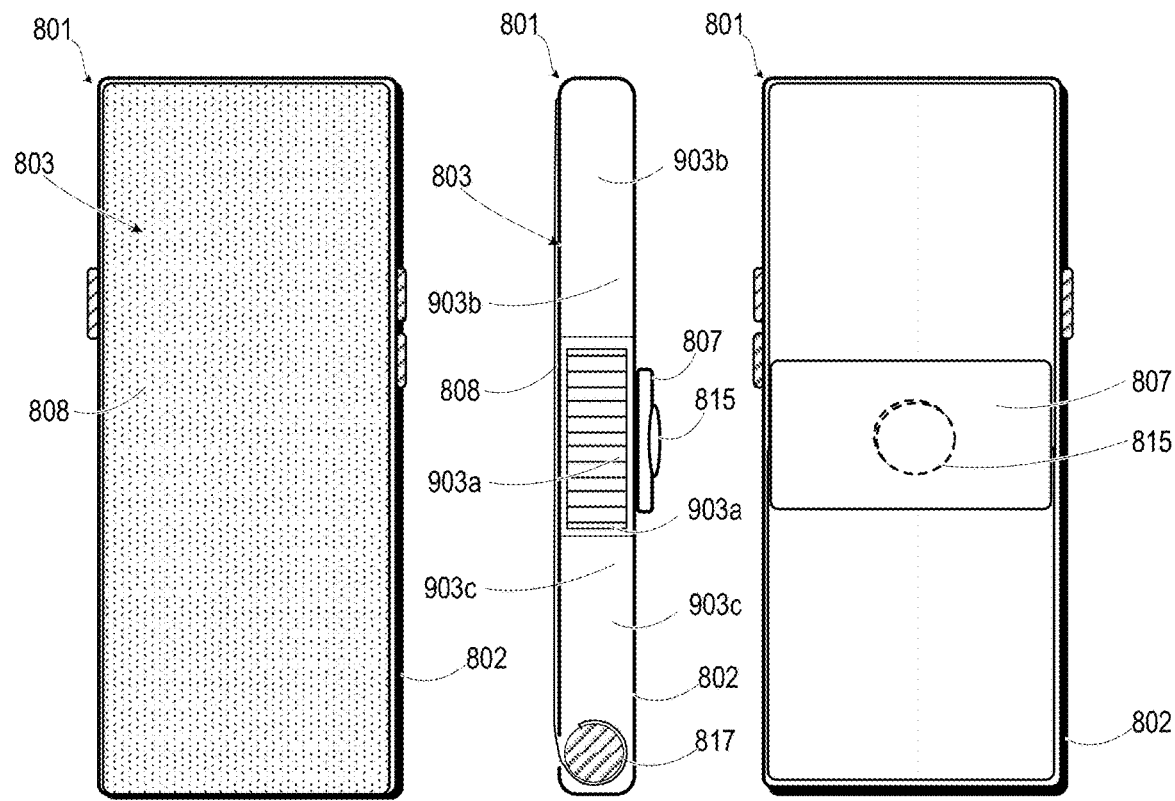
FIG. 9A   FIG. 9B   FIG. 9C

EXTENDABLE ELECTRONIC DEVICE THAT MITIGATES INADVERTENT TOUCH INPUT DURING MOVEMENT OF A FLEXIBLE DISPLAY

PRIORITY APPLICATION

This application claims priority to International Application No. PCT/CN2023/111581, filed Aug. 7, 2023, the contents of which are incorporated herein.

BACKGROUND

1. Technical Field

The present disclosure relates generally to electronic devices having an extendable form factor, and in particular to electronic device having an extendable form factor that changes an amount of a flexible display presented on a front side of a device housing.

2. Description of the Related Art

Portable electronic communication devices, particularly smartphones, have become ubiquitous. People all over the world use such devices to stay connected. These devices have been designed in various mechanical configurations. A first configuration, known as a "candy bar", is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other. With development of a flexible display, additional configurations have become available that enable changing a size of an area of the housing that is covered by a display. One configuration is a scrollable device having a flexible display covering a telescoping frame. While retracting, an excess portion of the flexible display scrolls into the telescoping frame. In addition, a number of configurations provide rollable devices that roll a portion of the flexible display onto a back side of a device housing when the display or extended frame supporting the display is retracted to present a smaller front dimension. In an example, a telescoping frame can include one or two rollers to enable the flexible display to roll around a corresponding one or two ends of the device. In another example, a blade assembly that includes a flexible display includes one portion that rolls around one end of the device housing and another end that can extend away from a single device housing.

While the communication device is being reconfigured (e.g., extending/retracting), a touch sensitive display of the communication device moves. An accidental touch of a touch sensitive display of the communication device may cause an unintentional invocation of actions on the communication device. In addition, a user may intend to select a control presented on the display, but the movement of the touch sensitive display may cause inadvertent selection of another control.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6A is a front view of another example electronic device having a rollable display assembly slidably coupled in a fully retracted position on a telescoping device housing, according to one or more embodiments;

FIG. 6B is a left side view of the example electronic device of FIG. 6A, according to one or more embodiments;

FIG. 6C is a back view of the example electronic device of FIG. 6A, according to one or more embodiments;

FIG. 7A is a front view of the example electronic device of FIG. 6A having the rollable display assembly slidably coupled in a fully extended position on the telescoping device housing, according to one or more embodiments;

FIG. 7B is a left side view of the example electronic device of FIG. 7A, according to one or more embodiments;

FIG. 7C is a back view of the example electronic device of FIG. 7A, according to one or more embodiments;

FIG. 8A is a front view of an additional example electronic device having a scrollable display assembly coupled across a front side of a telescoping device housing in a fully retracted position, according to one or more embodiments;

FIG. 8B is a left side view of the example electronic device of FIG. 8A, according to one or more embodiments;

FIG. 8C is a back view of the example electronic device of FIG. 8A, according to one or more embodiments;

FIG. 9A is a front view of the example electronic device of FIG. 8A having the telescoping device housing in a fully extended position, according to one or more embodiments;

FIG. 9B is a left side view of the example electronic device of FIG. 9A, according to one or more embodiments;

FIG. 9C is a back view of the example electronic device of FIG. 9A, according to one or more embodiments;

DETAILED DESCRIPTION

Figure 1:
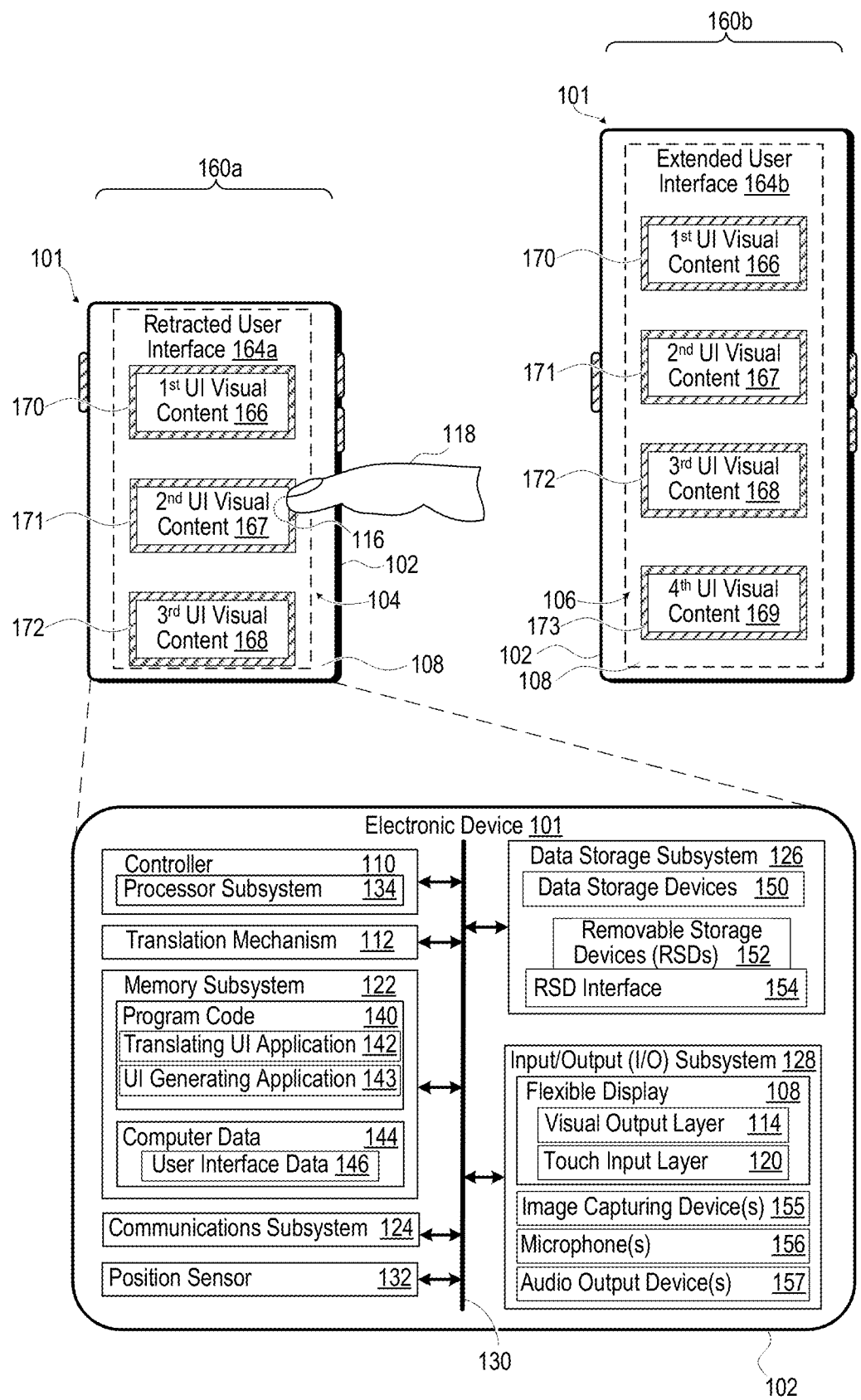
FIG. 1 presents a simplified functional block diagram of an electronic device having an extendable form factor, shown with front views of a flexible display presented in a retracted position and in an extended position, according to one or more embodiments.

According to a first aspect of the present disclosure, an electronic device, a method, and a computer program product mitigates inadvertent invocation or activation of control elements of a touch sensitive flexible/moveable display when the display is extending or retracting. In one or more embodiments, the electronic device includes a device housing having a front side and a back side. The electronic device includes a flexible display that is slidably coupled to the device housing. The flexible display includes a visual output layer and a touch input layer. The electronic device includes a translation mechanism that is operable to slide the flexible display relative to the device housing between a fully retracted position and a fully extended position. A controller of the electronic device is communicatively coupled to the flexible display and the translation mechanism. The controller determines a first user interface having a first size that fits within the front portion of the flexible display on the device housing. The controller presents user interface content in the first user interface on the visual output layer of the flexible display. The controller monitors for at least one touch input to one or more user interface controls associated with user interface content at a corresponding area of the touch input layer. In response to detecting activation of the translation mechanism to reposition the flexible display relative to the device housing, the controller configures a second user interface having a second size that fits within the flexible display on the front side of the device housing after repositioning the flexible display. The controller maintains presentation of the user interface content on the visual output layer in a smaller dimension of the first and the second user interface during repositioning of the flexible display. The controller maintains an association of one or more user interface controls at the touch input layer that correspond to the position of the user interface content in the smaller one of the first and the second user interface during the repositioning of the flexible display. Maintaining the smaller user interface content and touch interface positions during repositioning avoids refreshing of the user interface content following translation of the display and thereby mitigates inadvertent touch activation of a user interface control during the repositioning.

According to a second aspect of the present disclosure, a foldable electronic device, a method, and a computer program product mitigates inadvertent invocation or activation of control elements of a touch sensitive display when the electronic device is folding or unfolding. In one or more embodiments, an electronic device includes a housing assembly with first and second housings coupled at a hinge to pivot between a fully folded position and fully unfolded position. The electronic device includes a sensor that is configured to detect a change in a pivot position of the housing assembly. The electronic device includes at least one display coupled to the housing assembly. The at least one display includes a visual output layer and a touch input layer. A controller is communicatively coupled to the pivot sensor and the at least one display. The controller presents user interface content via the at least one display. In response to determining, based on input received from the sensor, that the pivot position of the housing assembly is changing, the controller ignores touch inputs to one or more user interface controls assigned to the touch input layer and corresponding user interface content, during the change of the pivot position.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of electronic device 101 that has an extendable form factor between a retracted position and an extended position, and in which the features of the present disclosure are advantageously implemented, according to one or more embodiments. Electronic device 101 includes device housing 102 having front side 104 and back side 106. Flexible display 108 is slidably coupled to device housing 102 and can be moved between a retracted position having smaller front-facing dimension and an extended position having a larger front-facing dimension. Flexible display 108 includes a visual output layer 114 and a touch input layer 120. Controller 110 manages positioning of flexible display 108 by triggering translation mechanism 112. Controller 110 manages presenting of visual content at visual output layer 114 of flexible display 108, and controller 110 manages relaying of touch inputs 116 made by user 118 and detected/identified by touch input layer 120 of flexible display 108. According to aspects of the present disclosure, while triggering translation mechanism 112, controller 110 manages sizing and resizing of and positional presentation of content on a user interface presented by flexible display 108 to mitigate inadvertent touch activations.

In one or more embodiments, electronic device 101 is a user device that may or may not include wireless communication capabilities to perform as a communication device. Electronic device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, electronic device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

In addition to translation mechanism 112 and controller 110, electronic device 101 may include memory subsystem 122, communications subsystem 124, data storage subsystem 126, and input/output (I/O) subsystem 128. To enable management by controller 110, system interlink 130 communicatively connects controller 110 with translation mechanism 112, memory subsystem 122, communications subsystem 124, data storage subsystem 126, I/O subsystem 128, and physical sensors such as position sensor 132. System interlink 130 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 130) are illustrated in FIG. 1, it is to be understood that more, fewer, or different interconnections may be present in other embodiments.

Controller 110 includes processor subsystem 134, which includes one or more central processing units (CPUs) or data processors. Processor subsystem 134 can include one or more digital signal processors that can be integrated with data processor(s). Processor subsystem 134 can include other processors such as auxiliary processor(s) that may act as a low power consumption, always-on sensor hub for physical sensors. Controller 110 manages, and in some instances directly controls, the various functions and/or operations of electronic device 101. These functions and/or operations can include, but are not limited to including, application data processing, communication with second communication devices, navigation tasks, image processing, and signal processing. In one or more alternate embodiments, electronic device 101 may use hardware component equivalents for application data processing and signal processing. For example, electronic device 101 may use special purpose hardware, dedicated processors, general purpose computers, microprocessor-based computers, micro-controllers, optical computers, analog computers, dedicated processors and/or dedicated hard-wired logic.

Memory subsystem 122 stores program code 140 for execution by processor subsystem 134 to provide the functionality described herein. Program code 140 includes applications such as translating user interface (UI) application 142 that may be software or firmware that, when executed by controller 110, configures electronic device 101 that at least in part manages visually presenting a UI and monitoring touch inputs to the UI on a flexible display that translates, in order to mitigate inadvertent touch inputs during translation of the display. Program code 140 includes one or more UI-generating applications 143 that are managed by translating UI application 142 in presenting UIs on flexible display 108. In one or more embodiments, several of the described aspects of the present disclosure are provided via executable program code of applications executed by controller 110. In one or more embodiments, program code 140 may be integrated into a distinct chipset or hardware module as firmware that operates separately from executable program code. Portions of program code 140 may be incorporated into different hardware components that operate in a distributed or collaborative manner. Implementation of program code 140 may use any known mechanism or process for doing so using integrated hardware and/or software, as known by those skilled in the art. Memory subsystem 122 further includes operating system (OS), firmware interface, such as basic input/output system (BIOS) or Uniform Extensible Firmware Interface (UEFI), and firmware, which may be considered as program code 140.

Program code 140 may access, use, generate, modify, store, or communicate computer data 144, such as UI data 146. Computer data 144 may incorporate "data" that originated as raw, real-world "analog" information that consists of basic facts and figures. Computer data 144 includes different forms of data, such as numerical data, images, coding, notes, and financial data. Computer data 144 may originate at electronic device 101 or be retrieved by electronic device 101. Electronic device 101 may store, modify, present, or transmit computer data 144. Computer data 144 may be organized in one of a number of different data structures. Common examples of computer data 144 include video, graphics, text, and images. Computer data 144 can also be in other forms of flat files, databases, and other data structures.

In one or more embodiments, controller 110, via communications subsystem 124, performs multiple types of cellular over-the-air (OTA) or wireless communication such as using a Bluetooth connection, or other personal access network (PAN) connection. In one or more embodiments, communications subsystem 124 communicates via a wireless local area network (WLAN) link using one or more IEEE 802.11 WLAN protocols. In one or more embodiments, communications subsystem 124 receives downlink channels from global positioning system (GPS) satellites to obtain geospatial location information. Communications subsystem 124 may communicate via an over-the-air (OTA) cellular connection with radio access networks (RANs).

Data storage subsystem 126 of electronic device 101 includes data storage device(s) 150. Controller 110 is communicatively connected, via system interlink 130, to data storage device(s) 150. Data storage subsystem 126 provides program code 140 and computer data 144 stored on non-volatile storage that is accessible by controller 110. For example, data storage subsystem 126 can provide a selection of program code 140 and computer data 144. These applications can be loaded into memory subsystem 122 for execution/processing by controller 110. In one or more embodiments, data storage device(s) 150 can include hard disk drives (HDDs), optical disk drives, and/or solid-state drives (SSDs), etc. Data storage subsystem 126 of electronic device 101 can include removable storage device(s) (RSD(s)) 152, which is received in RSD interface 154. Controller 110 is communicatively connected to RSD 152, via system interlink 130 and RSD interface 154. In one or more embodiments, RSD 152 is a non-transitory computer program product or computer readable storage device. Controller 110 can access data storage device(s) 150 or RSD 152 to provision electronic device 101 with program code 140 and computer data 144.

I/O subsystem 128 includes I/O devices such as flexible display 108, which includes visual output layer 114 that presents visual outputs. Flexible display 108 includes touch input layer that serves as a tactile touch screen interface for receiving touch inputs 116 made by user 118. I/O subsystem 128 may include one or more image capturing devices 155 to capture user gestures or facial expressions. I/O subsystem 128 may include microphone(s) 156 to receive user speech. I/O subsystem 128 may include audio output device(s) 157 to present audio outputs.

Referring now to the top left portion of FIG. 1, there is presented a first example image 160a of flexible display 108 with a UI presenting content at specific positions in an X-Y plane of flexible display 108. With first example image 160a, electronic device 101 is in a fully retracted position that provides, on front side 104 of device housing 102, a front portion of flexible display 108 having a retracted size. Controller 110 determines a first user interface (e.g., retracted user interface 164a) having a first size (e.g., retracted size) that fits within the front portion of flexible display 108 on device housing 102. Controller 110 generates first user interface (e.g., retracted user interface 164a) in part by presenting (or rendering) first, second, and third user interface (UI) visual content 166, 167, and 168 on visual output layer 114 of flexible display 108. Additional controls such as fourth UI visual content 169 (second example image 160b) do not fit within retracted user interface 164a). In generating first user interface (e.g., retracted user interface 164a), controller 110 further assigns corresponding first, second, and third UI controls 170, 171, and 172, respectively, on touch input layer 120 of flexible display 108. Controller 110 monitors for at least one touch input 116 to one or more of first, second, and third UI controls 170, 171, and 172 associated with first, second and third UI visual content 166, 167, and 168, respectively.

At second example image 160b at the top right of FIG. 1, electronic device 101 is in a fully extended position, which provides, on front side 104 of device housing 102, a front portion of flexible display 108 having an extended size that is larger than the retracted size. Controller 110 determines a first user interface (e.g., extended user interface 164b) having a second size (e.g., extended size) that fits within the front portion of flexible display 108 on device housing 102. Controller 110 generates second user interface (e.g., extended user interface 164b) in part by presenting first, second, third, and fourth UI visual content 166, 167, 168, and 169 on visual output layer 114 of flexible display 108. Controller 110 further assigns corresponding first, second, third, and fourth UI controls 170, 171, 172, and 173, respectively, on touch input layer 120 of flexible display 108. Controller 110 monitors for at least one touch input 116 to one or more first, second, third, and fourth UI controls 170, 171, 172, and 173 associated, respectively, with first, second, third and fourth UI visual content 166, 167, 168, and 169.

While the size of the current user interface is stable, such as when the display remains in the fully retracted or extended positions, controller 110 is not required to refresh flexible display 108 by adding or removing UI visual content presented on visual output layer 114 or reassigning associated UI controls on touch input layer 120. Considerations are not applicable for differences in the display refresh rate for visual output layer 114 versus touch refresh rate for touch input layer 120 that could cause an inadvertent activation of a UI control. However, when electronic device 101 is transitioning from a retracted position to an extended position or is transitioning from an extended position to a retracted position, refreshing of the size of the user interface can cause changes that could aggravate occurrences of inadvertent and/or incorrect control activation.

According to aspects of the present disclosure, controller 110 presents the first user interface. Controller 110 subsequently triggers translation mechanism 112, which operates to slide flexible display 108 relative to device housing 102 between the fully retracted position and the fully extended position. Controller 110 monitors position sensor 132 to determine a current translation position of flexible display 108. In response to detecting activation of translation mechanism 112 to reposition flexible display relative to device housing 102, controller 110 configures the second user interface having the second size that fits (or will fit) within flexible display 108 on front side 104 of device housing 102 after repositioning flexible display 108. Controller 110 maintains presentation of UI visual content on visual output layer 114 using a smaller one of the first and the second user interface during repositioning of flexible display 108. Controller 110 maintains an association of one or more UI controls at touch input layer that correspond to the user interface content in the smaller one of the first and second user interface (e.g., retracted UI 164a or extended UI 164b) during the repositioning of flexible display 108. When controller 110 resizes a user interface, controller 110 informs UI-generating application(s) 143 of the new bounds. The change in bounds causes UI-generating application(s) 143 to select and resize UI content for an assigned portion of the UI, prompting a refresh to the visual presentation and a refresh of the touch location assignments. The refresh to the visual presentation is humanly perceptible, degrading a user experience. The refresh of the touch location assignments may also be humanly perceptible in that an incorrect touch activation may result due to lag in reassignment, especially if the refresh rates are different between visual presentation and reassigning locations for touch inputs. During translation, the size of the flexible display 108 presented on front side 104 is continuously changing, potentially inviting a nearly continuous refreshing of the UI with a corresponding degradation in the user experience. By resizing the UI once either before or after translation, the humanly perceptible refreshing of the UI is limited to occurring once, mitigating the effects of the translation. In addition, by avoid refreshing of the user interface content, inadvertent/incorrect touch activation of a user interface control during the translation and prior to refreshing of the UI is prevented.

In one or more embodiments, in response to determining that translation mechanism 112 is repositioning flexible display 108 to a retracted position, controller 110 determines the second size of second user interface (e.g., retracted UI 164a) by identifying a retracting portion of flexible display 108 that will no longer be positioned on front side 104 of device housing 102 after the repositioning of flexible display 108. Controller 110 triggers removal of one or more portions of UI content 166-169 and each corresponding portion of UI controls 170-173 from the retracting portion of flexible display 108 concurrently with repositioning flexible display 108 to the retracted position. In an example, fourth UI visual content 169 and UI control 173 of extended UI 164b are removed in retracted UI 164a. Controller 110 integrates the remaining portions of UI content 166-168 into second user interface (i.e., retracted UI 164a), which is sized to fit within a remaining portion of flexible display 108 visible on front side 104 of electronic device 101.

Figure 2A:
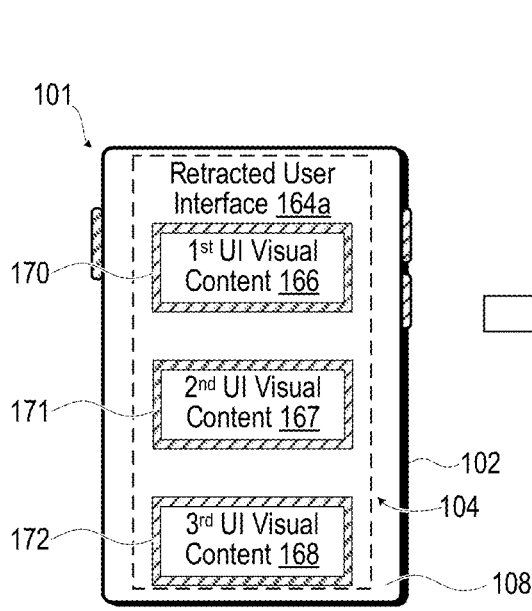
FIG. 2A is a front view of the electronic device triggered to extend while in a fully retracted position with the flexible display presenting, on a front side, a retracted user interface, according to one or more embodiments.
Figure 2B:
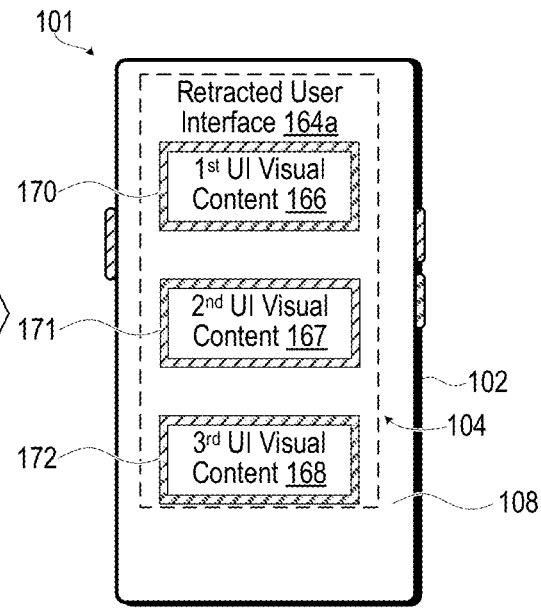
FIG. 2B is a front view of the electronic device translating to a partially extended position with the flexible display maintaining presentation, on the front side, of the retracted user interface, according to one or more embodiments.
Figure 2C:
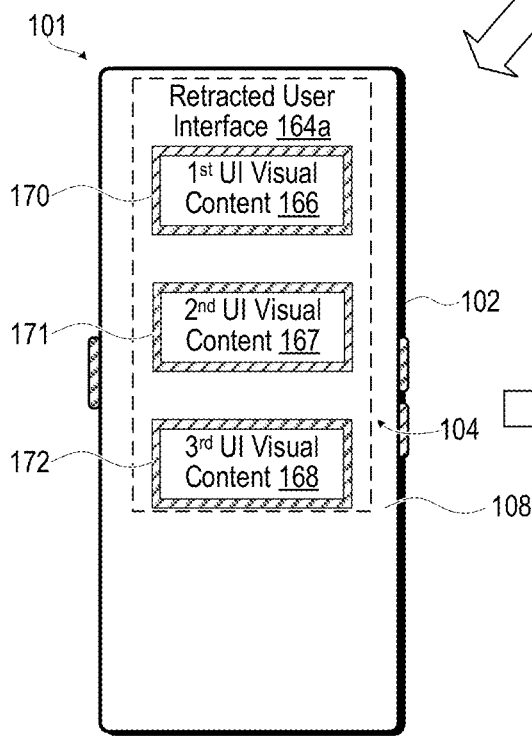
FIG. 2C is a front view of the electronic device reaching a fully extended position with the flexible display maintaining presentation, on the front side, of the retracted user interface, according to one or more embodiments.
Figure 2D:
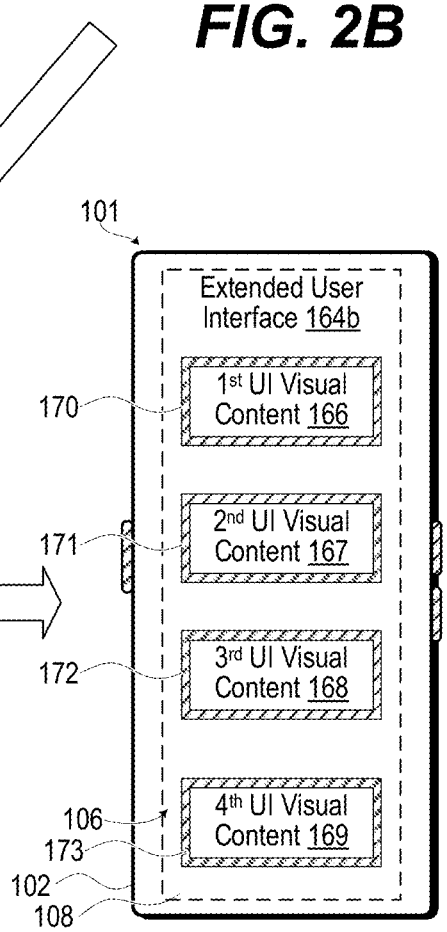
FIG. 2D is a front view of the electronic device refreshing presentation by the flexible display, on the front side, to an extended user interface while the flexible display is in the fully extended position, according to one or more embodiments.

FIGS. 2A-2D are a sequence of front views of electronic device 101 maintaining an original, smaller/retracted user interface while translating from a retracted position to an extended position, in order to avoid refreshing the visual output layer 114 and touch input layer 120 of flexible display 108 during the translation. FIG. 2A is a front view of electronic device 101 in a fully retracted position with flexible display 108 presenting, on front side 104, retracted user interface 164a. Retracted UI 164a includes first, second, and third UI visual content 166, 167, and 168 on visual output layer 114 with corresponding first, second, and third UI controls 170, 171, and 172 associated at locations monitored at touch input layer 120 (FIG. 1). While in the retracted position, controller 110 (FIG. 1) of electronic device 101 identifies a trigger for extending flexible display 108 to a target second size (e.g., fully extended position). Controller 110 (FIG. 1) determines the second user interface having the second size by identifying an extending portion of flexible display 108 that is not positioned on front side 104 but becomes positioned on front side 104 of device housing 102 in the extended position. Controller 110 (FIG. 1) delays presenting one or more portions of user interface content and delays assigning corresponding one or more portion of user interface controls to the extending portion of flexible display 108 until flexible display 108 is repositioned to the extended position. FIG. 2B is a front view of electronic device 101 in a partially extended position with flexible display 108 maintaining presentation, on front side 104, of retracted user interface 164a while flexible display 108 is translating. FIG. 2C is a front view of electronic device 101 reaching a fully extended position with flexible display 108 maintaining presentation, on front side 104, of retracted user interface 164a. FIG. 2D is a front view of electronic device 101 in the fully extended position with controller 110 (FIG. 1) changing presentation, on front side 104 of flexible display 108, to extended user interface 164b.

Figure 2E:
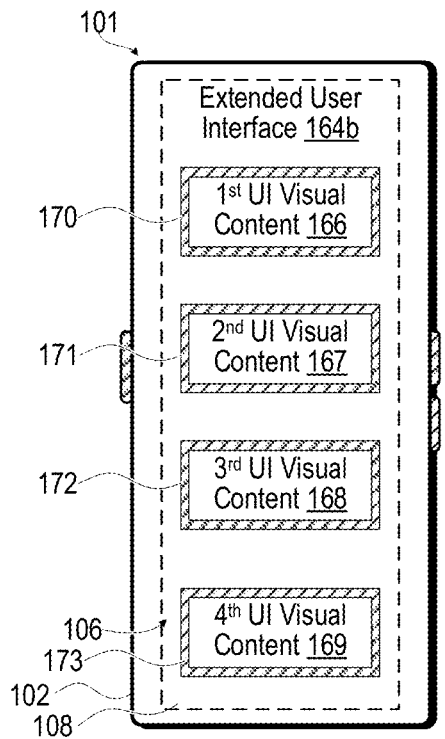
FIG. 2E is a front view of the electronic device triggered to retract while in the fully extended position, with the flexible display is presenting the extended user interface on the front side, according to one or more embodiments.
Figure 2F:
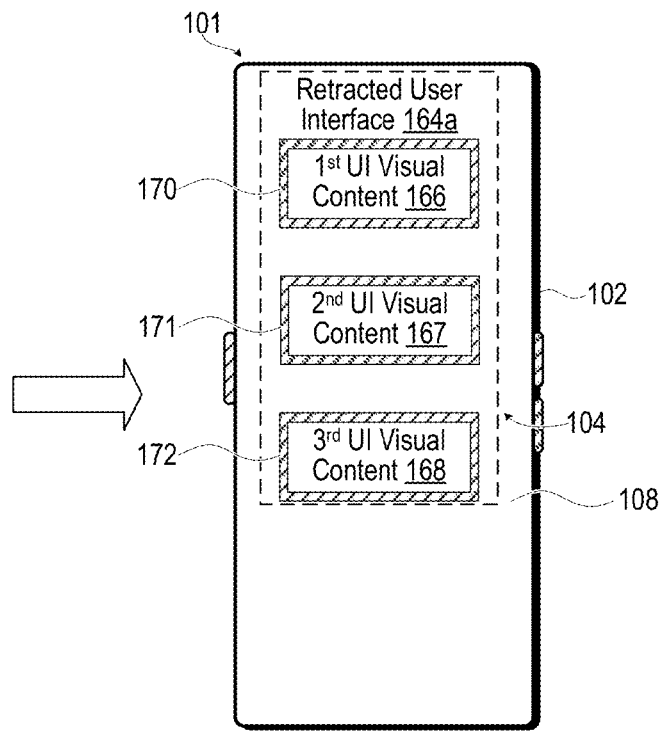
FIG. 2F is a front view of the electronic device, while still in the fully extended position, refreshing presentation by the flexible display of the retracted user interface on the front side, according to one or more embodiments.
Figure 2G:
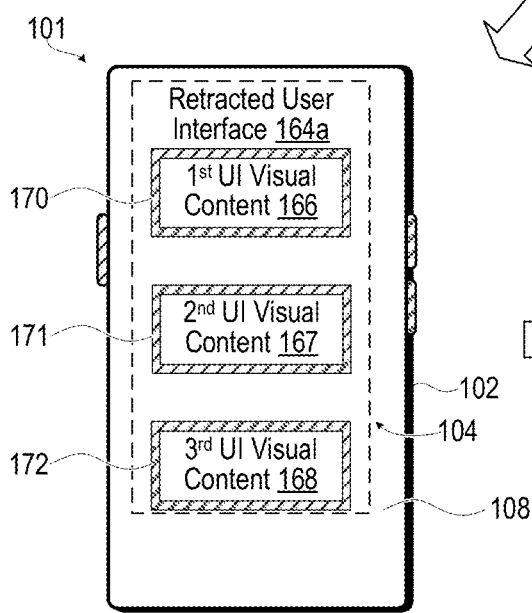
FIG. 2G is a front view of the electronic device translating to a partially retracted position with the flexible display maintaining presentation, on the front side, of the retracted user interface, according to one or more embodiments.
Figure 2H:
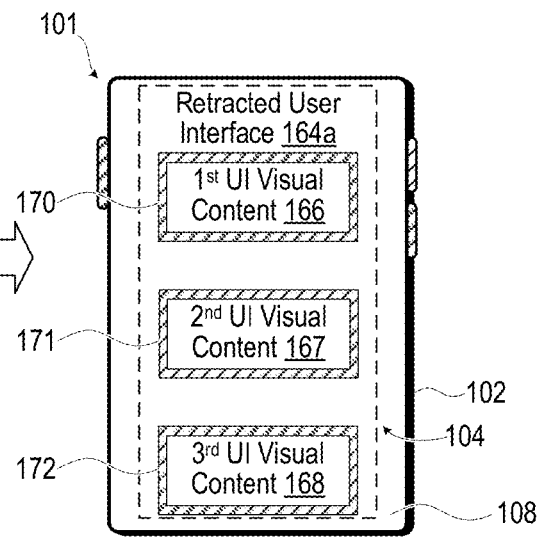
FIG. 2H is a front view of the electronic device reaching the fully retracted position while maintaining presentation by the flexible display, on the front side, of the retracted user interface, according to one or more embodiments.

FIGS. 2E-2H are a sequence of front views of electronic device 101 translating from extended position to a retracted position while maintaining a user interface to avoid refreshing the visual output layer 114 and touch input layer 120 of flexible display 108 during the translation. FIG. 2E is a front view of electronic device 101 in a fully extended position with flexible display 108 presenting, on front side 104, extended user interface 164b. Extended UI 164b includes first, second, third, and fourth UI visual content 166, 167, 168, and 169 on visual output layer 114 with corresponding first, second, third, and fourth UI controls 170, 171, 172, and 173 associated at locations monitored at touch input layer 120 (FIG. 1). While in the extended position, controller 110 (FIG. 1) of electronic device 101 identifies a trigger for retracting flexible display 108 to a target second size (e.g., fully retracted position). Controller 110 (FIG. 1) determines the second user interface having the second size by identifying a retracted portion of flexible display 108 that will no longer be positioned on front side 104 in the retracted position. FIG. 2F is a front view of electronic device 101 in the fully extended position with flexible display 108 updated to retracted UI 164a. Controller 110 (FIG. 1) triggers removal of one or more portions of the user interface content (e.g., fourth UI visual content 169) and each corresponding portion of user interface controls (e.g., fourth UI control 173) from the retracting portion of flexible display 108 in preparation for repositioning flexible display 108 to the retracted position. Controller 110 (FIG. 1) triggers integration of the one or more remaining portions of first UI (i.e., extended UI 164b) into the second UI (i.e., retracted UI 164a), which is sized to fit within a remaining portion of flexible display 108 visible on a front surface of electronic device 101. In an example, the retracted user interface 164a includes first, second and third UI visual content 166, 167, and 168 and UI controls 170, 171, and 172. FIG. 2G is a front view of electronic device 101 in a partially retracted position with flexible display 108 maintaining presentation of retracted UI 164a. FIG. 2H is a front view of electronic device 101 in the fully retracted position with flexible display 108 maintaining presentation, on front side 104, of retracted user interface 164a.

Figure 3A:
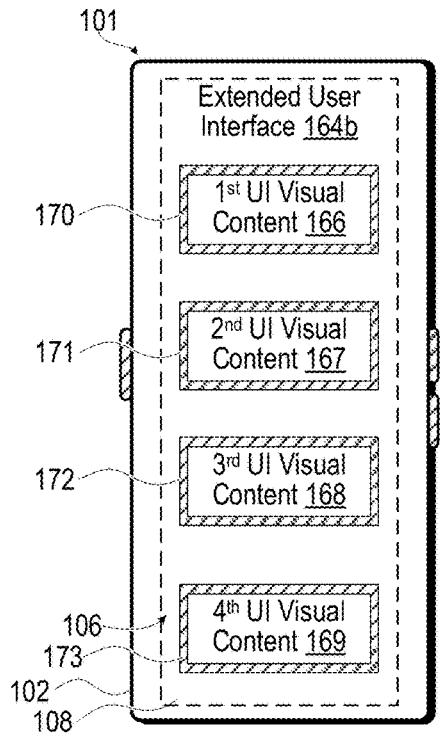
FIG. 3A is a front view of the electronic device triggered to retract while in the fully extended position, with the flexible display is presenting the extended user interface on the front side, according to one or more embodiments.
Figure 3B:
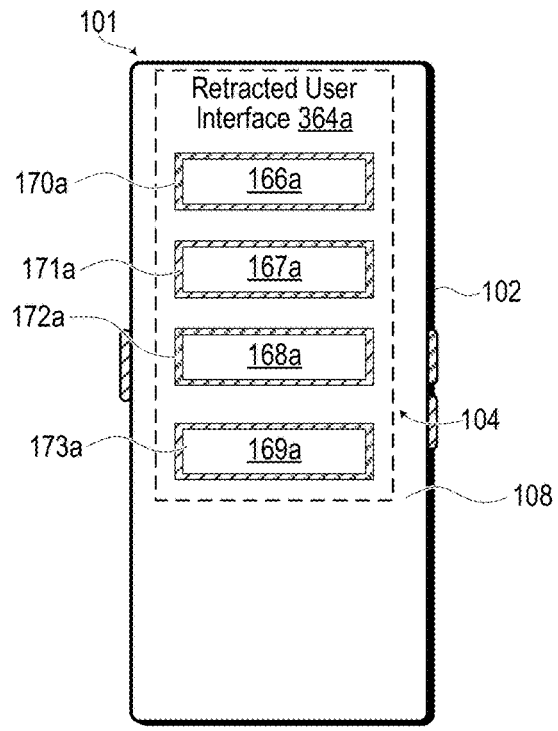
FIG. 3B is a front view of the electronic device, while still in the fully extended position, resizing content of the extended user interface to become an alternative retracted user interface, according to one or more embodiments.
Figure 3C:
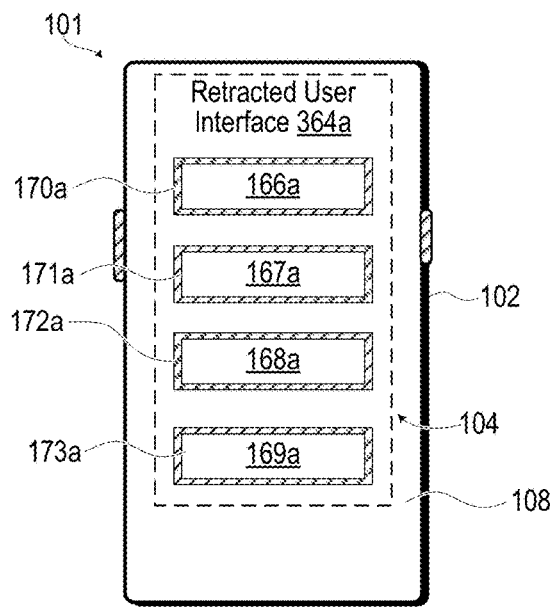
FIG. 3C is a front view of the electronic device translating to a partially retracted position with the flexible display maintaining presentation, on the front side, of the alternative retracted user interface, according to one or more embodiments.
Figure 3D:
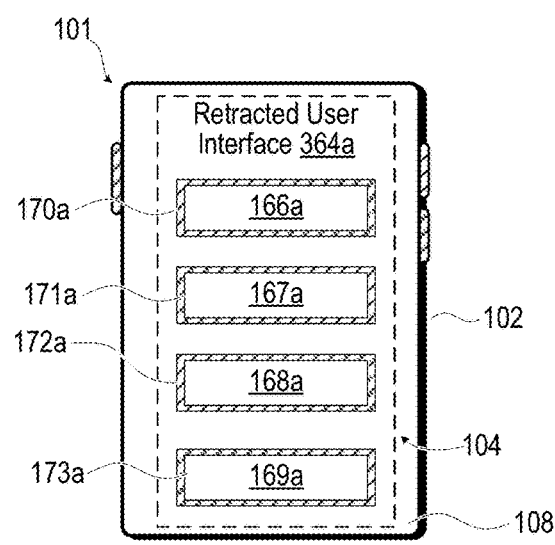
FIG. 3D is a front view of the electronic device reaching the fully retracted position while maintaining presentation by the flexible display, on the front side, of the alternative retracted user interface, according to one or more embodiments.

FIGS. 3A-3D are a sequence of front views of electronic device 101 translating from extended position to a retracted position while maintaining a user interface to avoid refreshing the visual output layer 114 and touch input layer 120 of flexible display 108 during the translation. FIG. 3A is a front view of electronic device 101 in a fully extended position with flexible display 108 presenting, on front side 104, extended user interface 164b. Extended UI 164b includes first, second, third, and fourth UI visual content 166, 167, 168, and 169 on visual output layer 114 with corresponding first, second, third, and fourth UI controls 170, 171, 172, and 173 associated at locations monitored at touch input layer 120 (FIG. 1). While in the extended position, controller 110 (FIG. 1) of electronic device 101 identifies a trigger for retracting flexible display 108 to a target second size (e.g., fully retracted position). Controller 110 (FIG. 1) determines the second user interface having the second size by identifying a retracted portion of flexible display 108 that will no longer be positioned on front side 104 in the retracted position. Instead of removing UI visual content, FIG. 2F is a front view of electronic device 101 in the fully extended position with flexible display 108 updated to alternative retracted UI 364a having resized content. Alternative retracted UI 364a includes compressed first, second, third, and fourth UI visual content 166a, 167a, 168a, and 169a on visual output layer 114 with corresponding compressed first, second, third, and fourth UI controls 170a, 171a, 172a, and 173a associated at locations monitored at touch input layer 120 (FIG. 1). FIG. 3C is a front view of electronic device 101 in a partially retracted position with flexible display 108 maintaining presentation of alternative retracted UI 364a. FIG. 3D is a front view of electronic device 101 in the fully retracted position of flexible display 108 with controller 110 (FIG. 1) maintaining presentation, on front side 104, of alternative retracted user interface 364a.

Figures 4A, 4B, 4C:
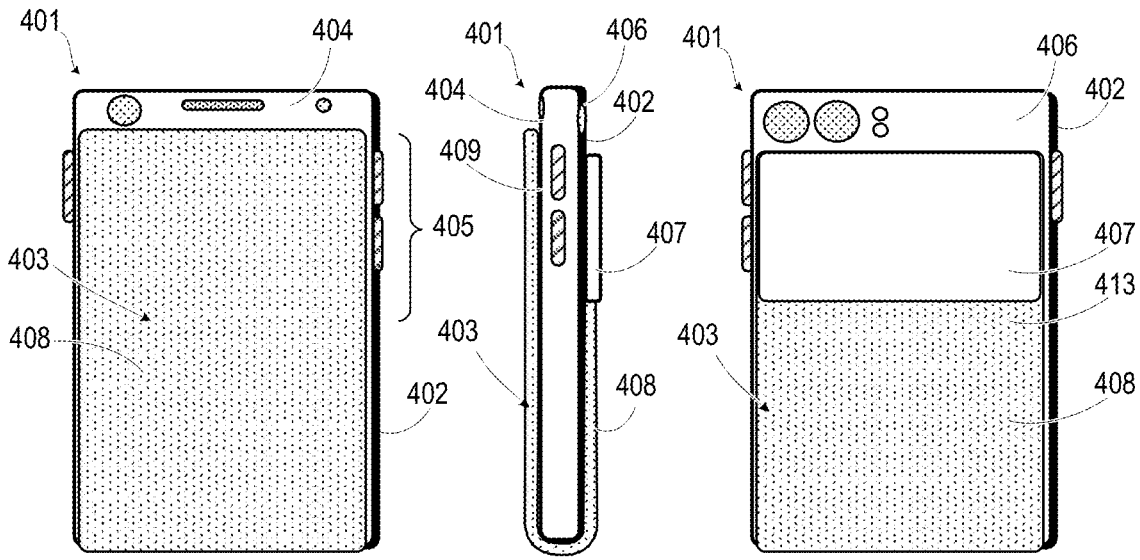
FIG. 4A is a front view of an example electronic device having a blade assembly slidably coupled in a fully retracted position on a non-telescoping device housing, according to one or more embodiments.
FIG. 4B is a left side view of the example electronic device of FIG. 4A, according to one or more embodiments.
FIG. 4C is a back view of the example electronic device of FIG. 4A, according to one or more embodiments.
Figures 5A, 5B, 5C:
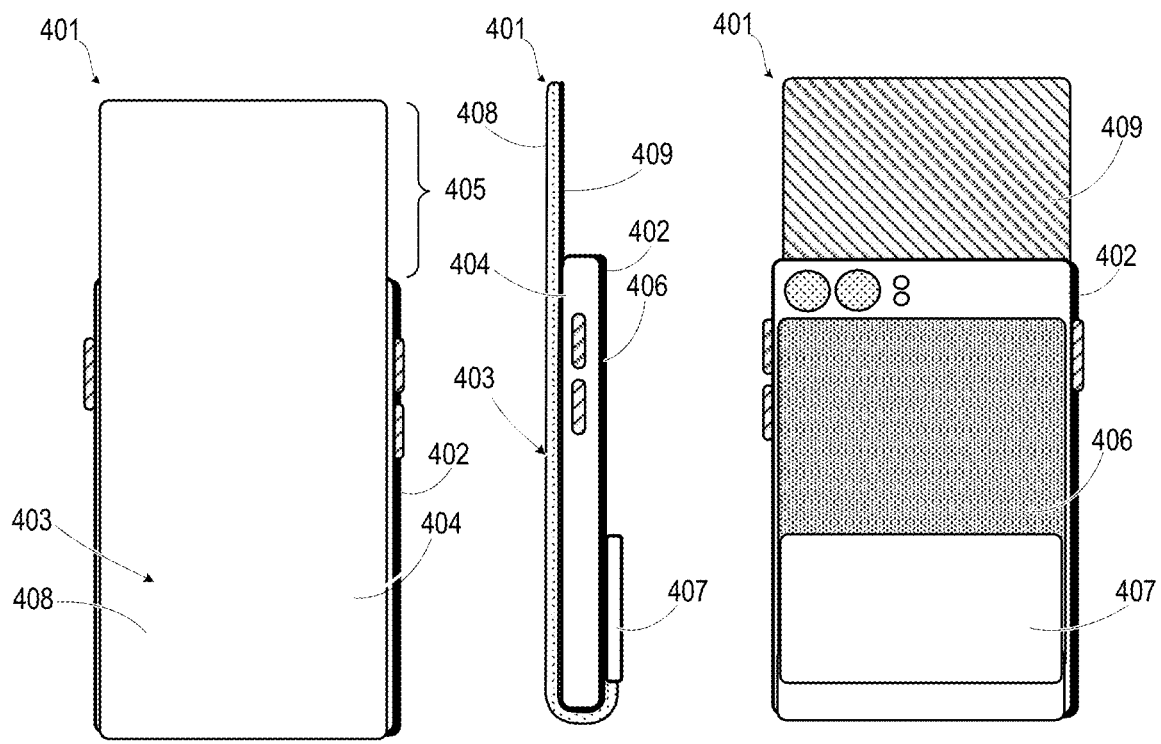
FIG. 5A is a front view of the example electronic device of FIG. 4A having the blade assembly slidably coupled in a fully extended position on the non-telescoping device housing, according to one or more embodiments.
FIG. 5B is a left side view of the example electronic device of FIG. 5A, according to one or more embodiments.
FIG. 5C is a back view of the example electronic device of FIG. 5A, according to one or more embodiments.

The extendable form factor of electronic device 101 may be implemented with a number of different movable structures. In an example, an extendable user device may be implemented as a rollable display provided by a blade assembly slidably coupled to a non-telescoping device housing, depicted in FIGS. 4A-4C and 5A-5C. FIG. 4A is a front view of example electronic device 401 having blade assembly 403 slidably coupled in a fully retracted position on non-telescoping device housing 402. Extending portion 405 of blade assembly is aligned with front side 404 of non-telescoping device housing 402. FIG. 4B is a left side view of electronic device 401 having flexible display 408 covering front side 404 and a lower portion of back side 406 of non-telescoping device housing 402. Blade substrate 409 of blade assembly 403 that is attached to move with flexible display 408 is proximate to non-telescoping device housing 402. FIG. 4C is a back view of electronic device 401 having a back portion of blade assembly 403. Cover 407 of blade assembly 403 is attached to trailing edge 413 of flexible display 408. FIG. 5A is a front view of electronic device 401 having blade assembly 403 slidably coupled in a fully extended position on non-telescoping device housing 402. Most or all of flexible display 108 has rolled onto or extends beyond front side 404 of non-telescoping device housing 402. Extending portion 405 of blade assembly 403 extends beyond front side 404 of non-telescoping device housing 402. FIG. 5B is a left side view of electronic device 401. FIG. 5C is a back view of electronic device 401. In FIGS. 5B-5C, cover 407 of blade assembly 403 has moved down but remains on back side 406 of non-telescoping device housing 402. Blade substrate 409 of blade assembly 403 provides rigidity and structural support to extending portion 405 of blade assembly 403 and corresponding portion of flexible display 408, enabling extension beyond non-telescoping device housing 402.

In another example, an extendable user device may be implemented as a rollable display device supported by a telescoping device housing, depicted in FIGS. 6A-6C and 7A-7C and described below. FIG. 6A is a front view of electronic device 601 having rollable display assembly 603 slidably coupled in a fully retracted position on telescoping device housing 602. Flexible display 408 of rollable display assembly 603 covers front side 604 of telescoping device housing 602. FIG. 6B is a left side view of electronic device 601. FIG. 6C is a back view of electronic device 601. In FIGS. 6B-6C, flexible display 608 of rollable display assembly 603 rolls around top edge 611 and bottom edge 613 of telescoping device housing 602. Cover 607 is fixed on back side 606 of telescoping device housing 602, such as to support back camera 615. FIG. 7A is a front view of electronic device 601 having rollable display assembly 603 slidably coupled in a fully extended position on telescoping device housing 602. FIG. 7B is a left side view of electronic device 601. Telescoping device housing 602 includes base housing 703a from which top housing 703b and bottom housing 703c extend. FIG. 7C is a back view of electronic device 601.

In an additional example, an extendable user device may be implemented as a scrollable display device supported by a telescoping device housing, depicted in FIGS. 8A-8C and 9A-9C and described below. FIG. 8A is a front view of electronic device 801 having scrollable display assembly 803 coupled across front side 804 of telescoping device housing 802 in a fully retracted position.

Flexible display 808 of scrollable display assembly 803 covers front side 804 of telescoping device housing 802. FIG. 8B is a left side view of electronic device 801. An excess portion of flexible display 808 is received by scrolling mechanism 817 in telescoping device housing 802. FIG. 8C is a back view of electronic device 801. In FIGS. 8B-8C, cover 807 is fixed on back side 806 of telescoping device housing 802, such as to support back camera 815. FIG. 9A is a front view of electronic device 801 having scrollable display assembly 803 slidably coupled in a fully extended position on telescoping device housing 802. FIG. 9B is a left side view of electronic device 801. Telescoping device housing 802 includes base housing 903a from which top housing 903b and bottom housing 903c extend. FIG. 9C is a back view of electronic device 801.

Figure 10A:
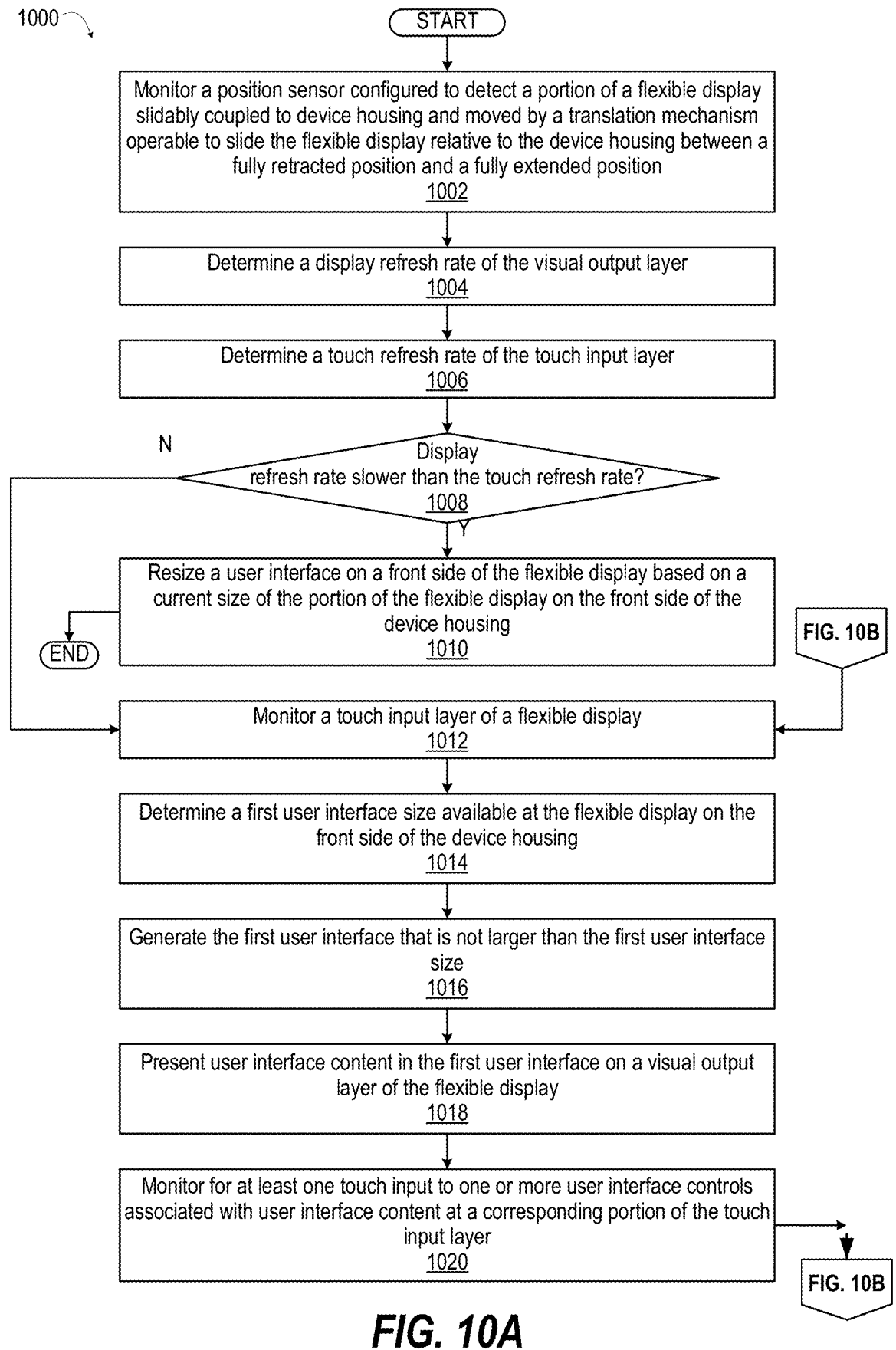
FIGS. 10A-10B (collectively "FIG. 10") are a flow diagram of a method of avoiding resizing of a user interface during translation of a flexible display to avoid refreshing the flexible display that may result in incorrect touch activations of touch controls, according to one or more embodiments.
Figure 10B:
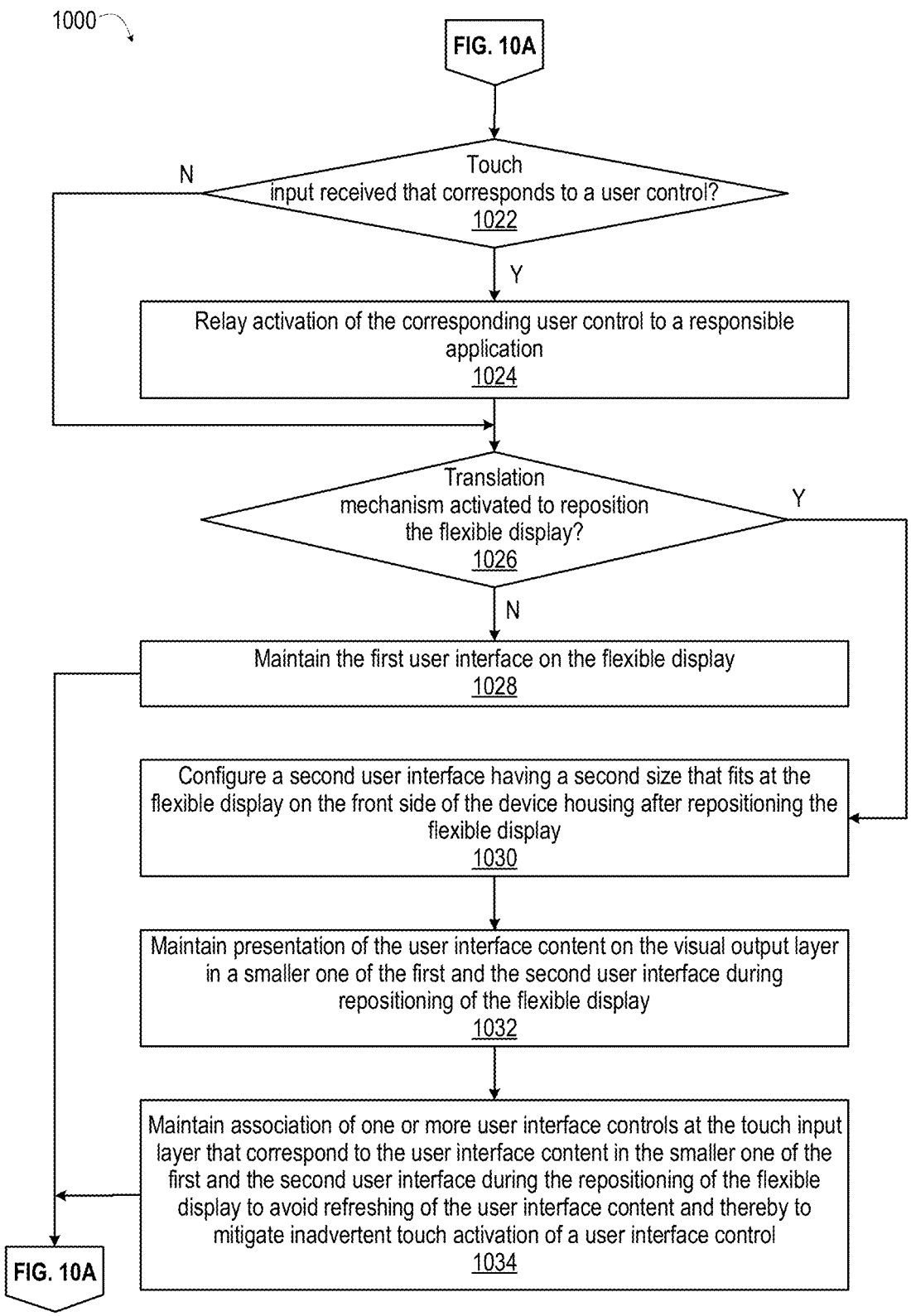
Figure 11:
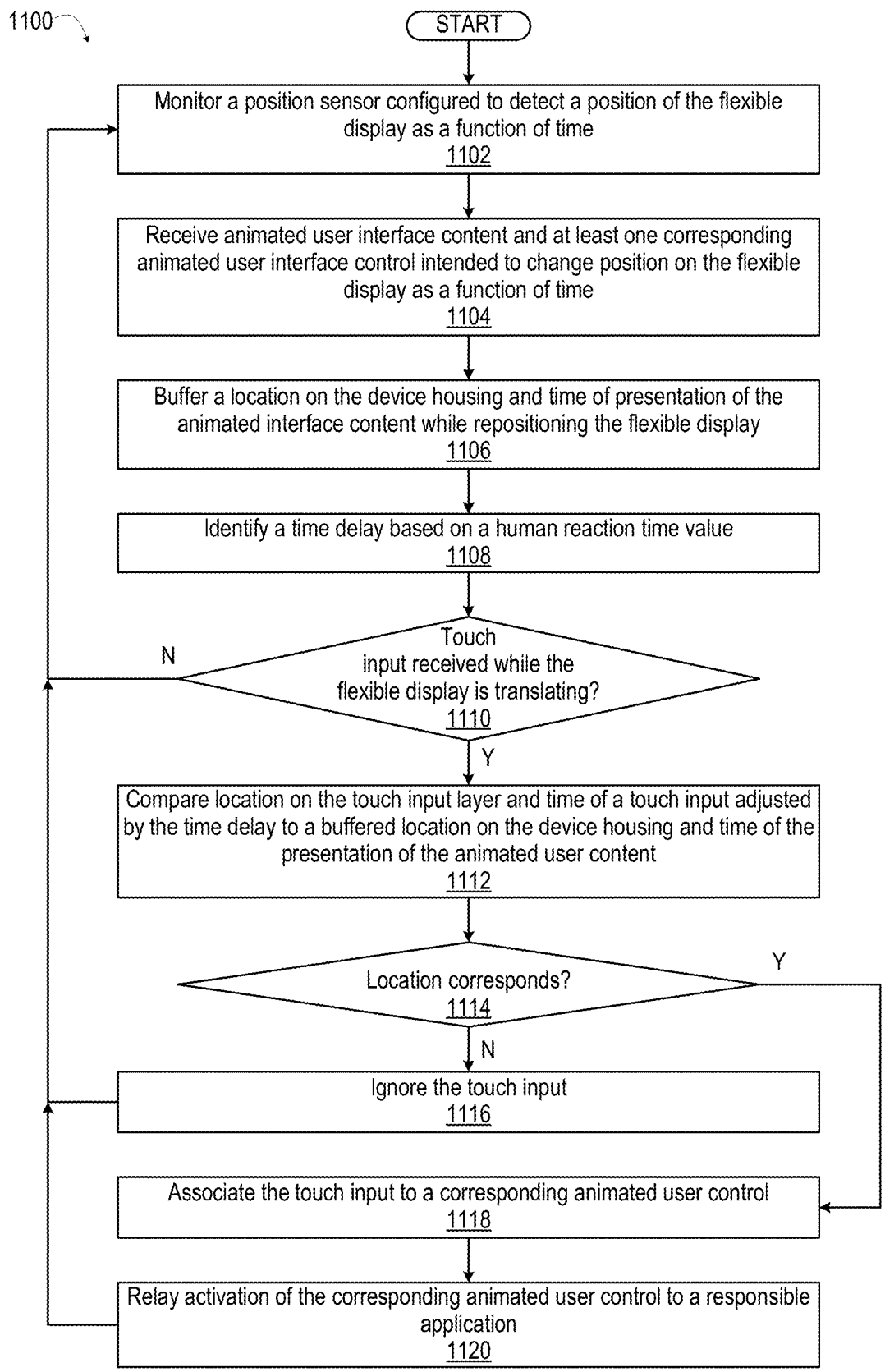
FIG. 11 is a flow diagram presenting a method of supporting an animated user interface (UI) while a flexible display is translating, with mitigation for inadvertent touch activations, according to one or more embodiments.

FIGS. 10A-10B (collectively "FIG. 10") are a flow diagram of a method of presenting a user interface during translation of a flexible display to avoid inadvertent touch activations of touch controls. FIG. 11 is a flow diagram presenting a method of supporting an animated UI and providing mitigation in the event of inadvertent touch activations while a flexible touch display is translating. The descriptions of method 1000 (FIG. 10) and method 1100 (FIG. 11) are provided with general reference to the specific components illustrated within the preceding FIGS. 1, 2A-2H, 3A-3D, 4A-4C, 5A-5C, 6A-6C, 7A-7B, 8A-8C, and 9A-9C. Specific components referenced in method 1000 (FIG. 10) and method 1100 (FIG. 11) may be identical or similar to components of the same name used in describing preceding FIGS. 1, 2A-2D, 3A-3D, 4A-4C, 5A-5C, 6A-6C, 7A-7B, 8A-8C, and 9A-9C. In one or more embodiments, controller 110 (FIG. 1) configures electronic device 101 (FIG. 1) to provide the described functionality of method 1000 (FIG. 10) and method 1100 (FIG. 11).

With reference to FIG. 10A, method 1000 includes monitoring a position sensor configured to detect movement of a portion of a flexible, touch screen display that is slidably coupled to device housing and moved by a translation mechanism, which is operable to slide the flexible display relative to the device housing between a fully retracted position and a fully extended position (block 1002). Method 1000 includes determining a display refresh rate of the visual output layer of the display (block 1004). Method 1000 includes determining a touch refresh rate of the touch input layer of the display (block 1006). Method 1000 includes determining whether the display refresh rate is slower than the touch refresh rate that results in a location offset of a touch position relative to the corresponding display content during repositioning/translating of the flexible display (decision block 1008). In response to determining that the display refresh rate is not slower (i.e., equal to or greater) than the touch refresh rate (i.e., not resulting in a location offset during repositioning of the flexible display) in decision block 1008, method 1000 includes resizing a user interface on a front side of the flexible display based on a current size of the portion of the flexible display on the front side of the device housing (block 1010). Then method 1000 ends.

In response to determining that the display refresh rate is slower than the touch refresh rate (i.e., resulting in a location offset during repositioning of the flexible display), method 1000 includes monitoring a touch input layer of a flexible display (block 1012). Method 1000 includes determining a first user interface size available at the flexible display on the front side of the device housing (block 1014). Method 1000 includes generating the first user interface that is not larger than the first user interface size (block 1016). Then method 1000 proceeds to block 1018 of FIG. 10B.

With reference to FIG. 10B, method 1000 includes presenting user interface content in the first user interface on a visual output layer of the flexible display (block 1018). Method 1000 includes monitoring for at least one touch input to one or more user interface controls associated with user interface content at a corresponding portion of the touch input layer (block 1020). Method 1000 includes determining whether a touch input is received that corresponds to a user control (decision block 1022). In response to determining that a touch input is received that corresponds to a user control, method 1000 includes relaying activation of the corresponding user control to a responsible application (block 1024). In response to determining that a touch input is not received that corresponds to a user control in decision block 1022 or after block 1024, method 1000 includes determining whether the translation mechanism is activated to reposition the flexible display (decision block 1026). In response to not detecting activation of the translation mechanism to reposition the flexible display, method 1000 includes maintaining the first user interface on the flexible display (block 1028). Then method 1000 returns to block 1012 (FIG. 10A).

In response to detecting activation of the translation mechanism to reposition the flexible display in decision block 1026, method 1000 includes configuring a second user interface having a second size that fits at the flexible display on the front side of the device housing after repositioning the flexible display (block 1030). Method 1000 includes identifying which of the first and the second user interfaces is smaller and maintaining presentation of the user interface content on the visual output layer in a smaller one of the first and the second user interface during repositioning of the flexible display (block 1032). Method 1000 includes maintaining association of one or more user interface controls at the touch input layer that correspond to the user interface content in the smaller one of the first and the second user interface during the repositioning of the flexible display (block 1034). When the user interface resizes, applications that generate UI content and controls may change what is to be included in the UI, causing a refresh of presentation of visual UI content and a refresh of associated locations for UI controls. The refresh may be humanly perceptible. With continual translation, the resizing and resulting refreshing of the flexible display may be also continual. The lag repositioning the visual presentation and the lag in reassigning locations for UI controls may create a situation in which a user may inaccurately activate a particular user control. The physical movement of the flexible display during translation may be slow, but the movement in addition to the refreshing of the flexible display may aggravate an ability of a user to accurately activate a user control. By preventing refreshing of the flexible display during translation, inaccuracy of selecting a user control is only due to the physical movement of the flexible display. Thus, avoiding refreshing of the user interface content mitigates inadvertent touch activation of a user interface control during translation of the display. Then method 1000 returns to block 1012 (FIG. 10A).

In one or more embodiments, in response to determining that the translation mechanism is repositioning the flexible display from an extended position to a retracted position, method 1000 includes determining the second user interface having the second size by identifying a retracting portion of the flexible display that will no longer be positioned on the front side of the device housing after the repositioning of the flexible display. Method 1000 includes removing one or more portions of the user interface content and each corresponding portion of user interface controls from the retracting portion of the flexible display prior to repositioning the flexible display to the retracted position.

In one or more embodiments, in response to determining that the translation mechanism is repositioning the flexible display from a retracted position to an extended position, method 1000 includes determining the second size of the second user interface by identifying an extending portion of the flexible display that is not positioned on the front side but becomes positioned on the front side of the device housing in the extended position. Method 1000 includes delaying presenting one or more additional portions of user interface content and delaying assigning corresponding one or more portions of user interface controls to the extending portion of the flexible display until the flexible display is repositioned to the extended position.

In one or more embodiments, a blade assembly of the electronic device has a blade substrate that is slidably coupled to the device housing and moved by the translation mechanism. The visual output layer and the touch input layer of the flexible display are attached to move with the blade substrate. The blade assembly extends out from one end of the device housing while in an at least partially extended position. In one or more alternative embodiments, the device housing includes a telescoping structure positionable between the retracted and extended positions.

With reference to FIG. 11, method 1100 includes monitoring a position sensor configured to detect a position of the flexible display as a function of time (block 1102). Method includes receiving animated user interface content and at least one corresponding animated user interface control intended to change position on the flexible display as a function of time (block 1104). Method 1100 includes buffering a location on the device housing and time of presentation of the animated interface content while repositioning the flexible display (block 1106). Method 1100 includes identifying a time delay based on a human reaction time value (block 1108). Method 1100 includes determining whether a touch input is received from a touch input layer of the flexible display while the flexible display is translating (decision block 1110). In response to not receiving a touch input from the visual input layer of the flexible display while the flexible display is translating, method 1100 returns to block 1102. In response to receiving a touch input from the visual input layer of the flexible display while the flexible display is translating, method 1100 includes comparing a location on the touch input layer and time of a touch input adjusted by the time delay to a buffered location on the device housing and time of the presentation of the animated user content, respectively (block 1112). Method 1100 includes determining whether the location corresponds to the buffered location (decision block 1114). In response to determining that the location on the touch input layer and time of a touch input adjusted by the time delay does not correspond to the buffered location on the device housing and time of the presentation of the animated user content, method 1100 includes ignoring the touch input (block 1116). Method 1100 returns to block 1102. In response to determining that the location on the touch input layer and time of a touch input adjusted by the time delay corresponds to the buffered location on the device housing and time of the presentation of the animated user content, method 1100 includes associating the touch input to a corresponding animated user control (block 1118). Method 1100 includes relaying activation of the corresponding animated user control to a responsible application (block 1120). Then method 1100 returns to block 1102.

Figure 12:
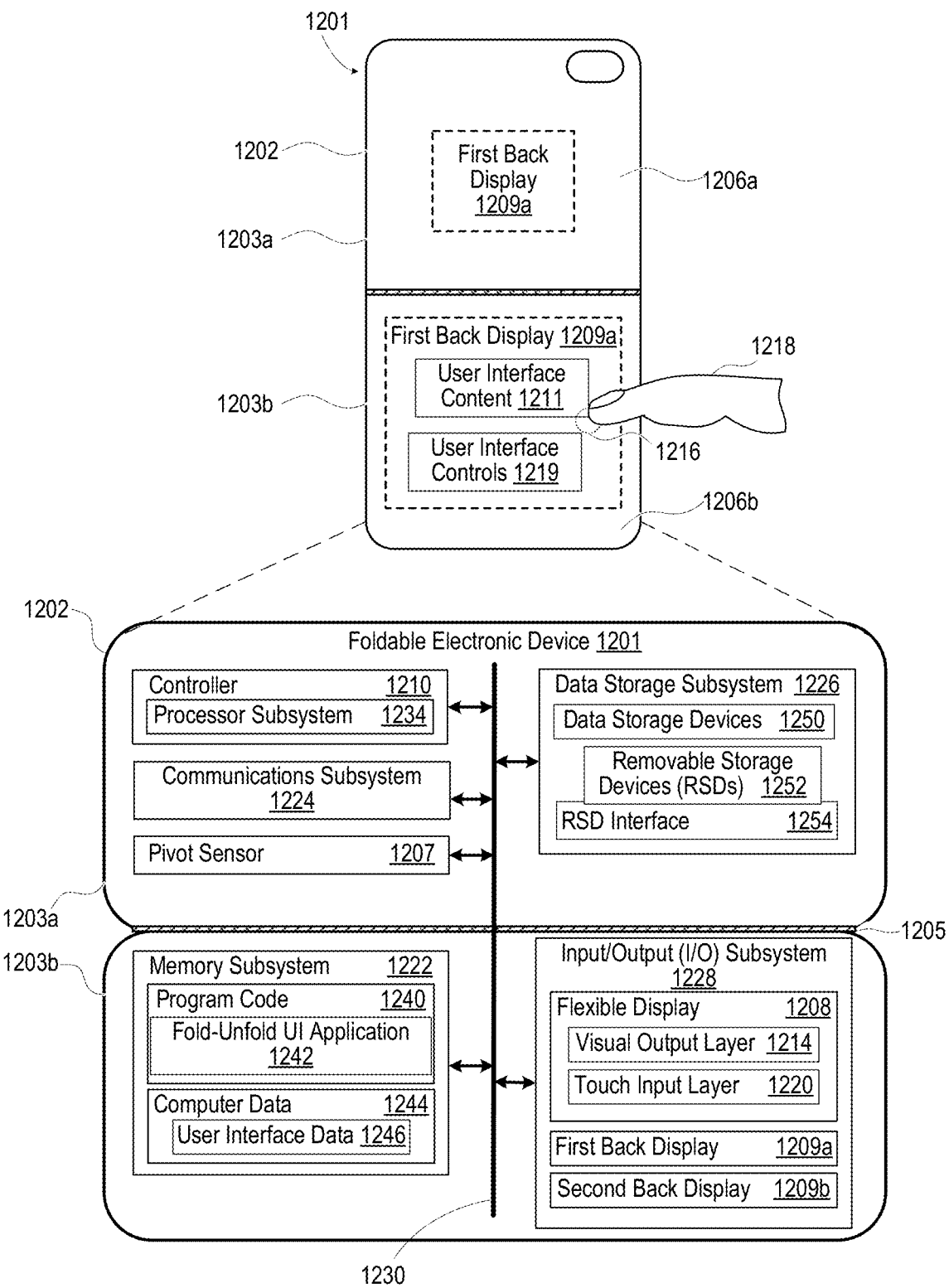
FIG. 12 presents a simplified functional block diagram of an electronic device having a foldable form factor, shown with an unfolded back view, according to one or more embodiments.
Figure 13A:
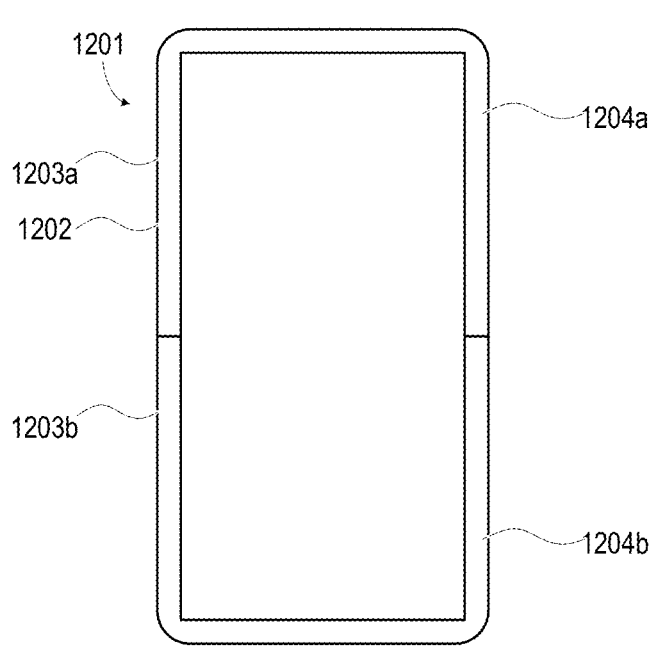
FIG. 13A depicts the electronic device of FIG. 12, shown in an unfolded front view, according to one or more embodiments.
Figure 13B:
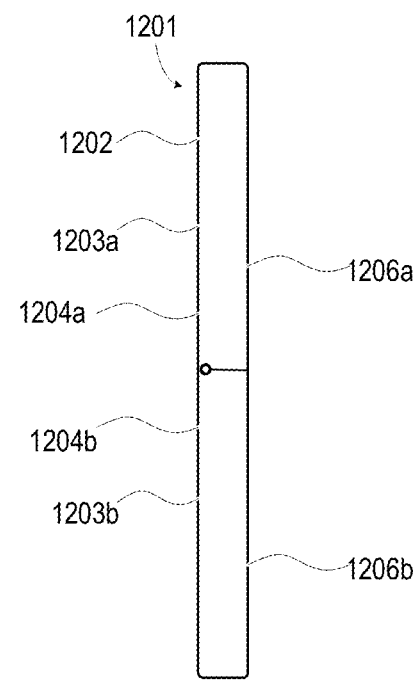
FIG. 13B depicts a left side view of the electronic device of FIG. 13A, according to one or more embodiments.
Figure 14A:
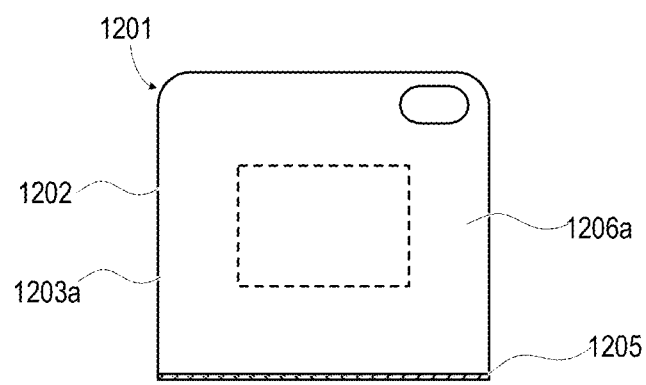
FIG. 14A depicts a back view of a first housing of the electronic device of FIG. 12 that is folded, according to one or more embodiments.
Figure 14B:
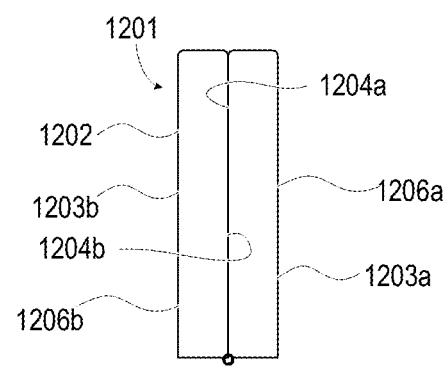
FIG. 14B depicts a left side view of the electronic device of FIG. 14A, according to one or more embodiments.
Figure 15:
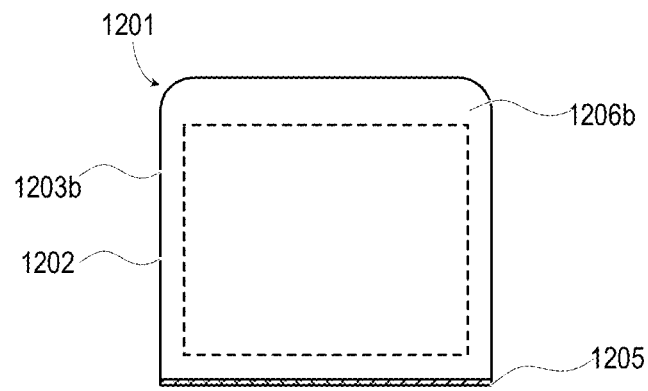
FIG. 15 depicts a back view of a second housing of the electronic device of FIG. 14 that is folded, according to one or more embodiments.
Figure 16:
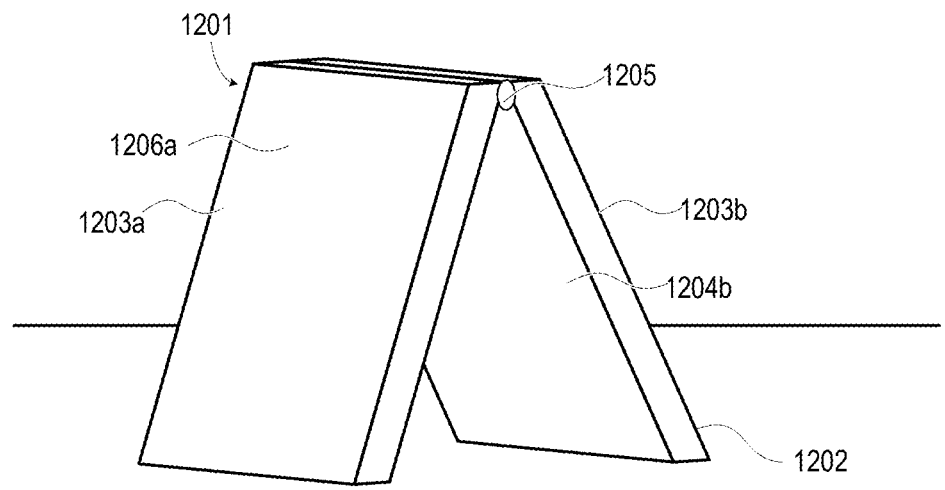
FIG. 16 presents the electronic device of FIG. 12 in a partially unfolded tent position with an intermediate pivot position of an acute angle, according to one or more embodiments.
Figure 17:
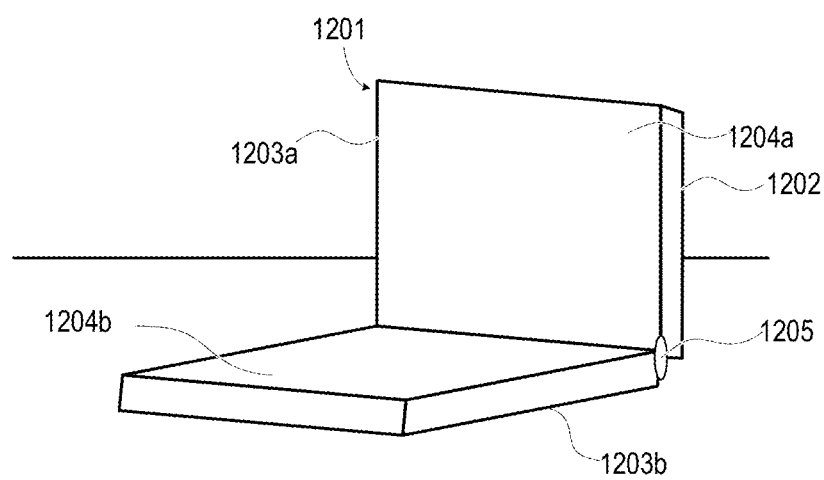
FIG. 17 presents the electronic device of FIG. 12 in a partially unfolded stand position with an intermediate pivot angle of approximately a right angle, according to one or more embodiments.

FIG. 12 presents a simplified functional block diagram of electronic device 1201 including housing assembly 1202 that has a foldable form factor, in which the features of the present disclosure are advantageously implemented. Housing assembly 1202 includes first and second housings 1203a-1203b coupled at hinge 1205 to pivot between a fully folded position and fully unfolded position. Housing assembly 1202 is positioned to depict back sides 1206a-1206b respectively of first and second housings 1203a-1203b. In one or more embodiments, first back display 1209a is positioned at back side 1206a of first housing 1203a. In one or more embodiments, second back display 1209b is positioned at back side 1206b of second housing 1203b. FIG. 13A depicts electronic device 1201, shown in an unfolded front view. Housing assembly 1202 is positioned to depict front sides 1204a-1204b respectively of first and second housings 1203a-1203b. FIG. 13B depicts a left side view of electronic device 1201 that is unfolded. Front sides 1204a-1204b of first and second housings 1203a-1203b respectively unfold, pivoting apart in intermediate pivot positions to a fully unfolded position in planar alignment. FIG. 14A depicts a back view of a first housing of electronic device 1201 that is folded. FIG. 14B depicts a left side view of the electronic device 1201 of FIG. 14A. Front sides 1204a-1204b of first and second housings 1203a-1203b, respectively, are brought together in the folded position. FIG. 15 depicts a back view of a second housing of electronic device 1201 that is folded. FIG. 16 presents electronic device 1201 in a partially unfolded tent position with an intermediate pivot position of an acute angle. FIG. 17 presents electronic device 1201 in a partially unfolded stand position with an intermediate pivot angle of approximately a right angle.

With continuing reference to FIG. 12, pivot sensor 1207 is configured to detect a change in the pivot position of housing assembly 1202. At least one touch screen display is coupled to housing assembly 1202. In an example, flexible display 1208 includes visual output layer 1214 and touch input layer 1220. Flexible display 1208 extends across front sides 1204a-1204b of first and second housings 1203a-1203b. Controller 1210 of electronic device 1201 is communicatively coupled to pivot sensor 1207 and the at least one display (1208, 1209a, and 1209b). Controller 1210 presents user interface content 1211 via the at least one display, such as at flexible display 1208. In response to determining, based on input received from pivot sensor 1207, that the pivot position of housing assembly 1202 is changing, controller 1210 ignores touch inputs 1216 by user 1218 to one or more user interface controls 1219 assigned to touch input layer 1220 and corresponding to user interface content 1211 during the change of the pivot position.

In one or more embodiments, electronic device 1201 is a user device that may or may not include wireless communication capabilities to perform as a communication device. Electronic device 1201 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, electronic device 1201 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

In addition to controller 1210, electronic device 1201 may include memory subsystem 1222, communications subsystem 1224, data storage subsystem 1226, and input/output (I/O) subsystem 1228. I/O subsystem 1228 includes I/O devices such as flexible display 1208. To enable management by controller 1210, system interlink 1230 communicatively connects controller 1210 with memory subsystem 1222, communications subsystem 1224, data storage subsystem 1226, I/O subsystem 1228, and physical sensors such as pivot sensor 1207. System interlink 1230 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 1230) are illustrated in FIG. 12, it is to be understood that more, fewer, or different interconnections may be present in other embodiments.

Controller 1210 includes processor subsystem 1234, which includes one or more central processing units (CPUs) or data processors. Processor subsystem 1234 can include one or more digital signal processors that can be integrated with data processor(s). Processor subsystem 1234 can include other processors such as auxiliary processor(s) that may act as a low power consumption, always-on sensor hub for physical sensors. Controller 1210 manages, and in some instances directly controls, the various functions and/or operations of electronic device 1201. These functions and/or operations include, but are not limited to including, application data processing, communication with second communication devices, navigation tasks, image processing, and signal processing. In one or more alternative embodiments, electronic device 1201 may use hardware component equivalents for application data processing and signal processing. For example, electronic device 1201 may use special purpose hardware, dedicated processors, general purpose computers, microprocessor-based computers, micro-controllers, optical computers, analog computers, dedicated processors and/or dedicated hard-wired logic.

Memory subsystem 1222 stores program code 1240 for execution by processor subsystem 1234 to provide the functionality described herein. Program code 1240 includes applications such as fold-unfold user interface (UI) application 1242 that may be software or firmware that, when executed by controller 1210, configures electronic device 1201 that at least in part manages visually presenting a UI and input monitoring touch inputs to the UI on a flexible display that translates to mitigate inadvertent touch inputs. In one or more embodiments, several of the described aspects of the present disclosure are provided via executable program code of applications executed by controller 1210. In one or more embodiments, program code 1240 may be integrated into a distinct chipset or hardware module as firmware that operates separately from executable program code. Portions of program code 1240 may be incorporated into different hardware components that operate in a distributed or collaborative manner. Implementation of program code 1240 may use any known mechanism or process for doing so using integrated hardware and/or software, as known by those skilled in the art. Memory subsystem 1222 further includes operating system (OS), firmware interface, such as basic input/output system (BIOS) or Uniform Extensible Firmware Interface (UEFI), and firmware, which may be considered as program code 1240.

Program code 1240 may access, use, generate, modify, store, or communicate computer data 1244, such as UI data 1246. Computer data 1244 may incorporate "data" that originated as raw, real-world "analog" information that consists of basic facts and figures. Computer data 1244 includes different forms of data, such as numerical data, images, coding, notes, and financial data. Computer data 1244 may originate at electronic device 1201 or be retrieved by electronic device 1201. Electronic device 1201 may store, modify, present, or transmit computer data 1244. Computer data 1244 may be organized in one of a number of different data structures. Common examples of computer data 1244 include video, graphics, text, and images. Computer data 1244 can also be in other forms of flat files, databases, and other data structures.

In one or more embodiments, controller 1210, via communications subsystem 1224, performs multiple types of cellular over-the-air (OTA) or wireless communication such as using a Bluetooth connection, or other personal access network (PAN) connection. In one or more embodiments, communications subsystem 1224 communicates via a wireless local area network (WLAN) link using one or more IEEE 802.11 WLAN protocols. In one or more embodiments, communications subsystem 1224 receives downlink channels from global positioning system (GPS) satellites to obtain geospatial location information. Communications subsystem 1224 may communicate via an over-the-air (OTA) cellular connection with radio access networks (RANs).

Data storage subsystem 1226 of electronic device 1201 includes data storage device(s) 1250. Controller 1210 is communicatively connected, via system interlink 1230, to data storage device(s) 1250. Data storage subsystem 1226 provides program code 1240 and computer data 1244 stored on nonvolatile storage that is accessible by controller 1210. For example, data storage subsystem 1226 can provide a selection of program code 1240 and computer data 1244. These applications can be loaded into memory subsystem 1222 for execution/processing by controller 1210. In one or more embodiments, data storage device(s) 1250 can include hard disk drives (HDDs), optical disk drives, and/or solid-state drives (SSDs), etc. Data storage subsystem 1226 of electronic device 1201 can include removable storage device(s) (RSD(s)) 1252, which is received in RSD interface 1254. Controller 1210 is communicatively connected to RSD 1252, via system interlink 1230 and RSD interface 1254. In one or more embodiments, RSD 1252 is a non-transitory computer program product or computer readable storage device. Controller 1210 can access data storage device(s) 1250 or RSD 1252 to provision electronic device 1201 with program code 1240 and computer data 1244.

In one or more embodiments, at least one display includes a front display (e.g., flexible display 1208) on an inner side of at least one of one of first housing 1203*a* and second housing 1203*b*. The front display is hidden by an opposing one of first housing 1203*a* and second housing 1203*b*, while electronic device 1201 is in the fully folded position, and exposed for user interfacing and content presentation, while electronic device 1201 is in the fully unfolded position. In ignoring the touch inputs, controller 1210 delays activating the front display in response to determining that the pivot position is transitioning from the fully folded position to the fully unfolded position. Controller 1210 deactivates the front display in response to determining that the pivot position is transitioning from the fully unfolded position to the fully folded position.

In one or more embodiments, housing assembly 1202 is configured to remain at an intermediate pivot position between the fully folded position and the fully unfolded position for positioning electronic device 1201 in a stand or tent orientation. The at least one display includes a front display (e.g., flexible display 1208) on an inner side of at least one of one of first housing 1203*a* and second housing 1203*b*. The front display is hidden by an opposing one of first housing 1203*a* and second housing 1203*b*, while electronic device 1201 is in the fully folded position, and exposed for user interfacing and content presentation, while electronic device 1201 is in the fully unfolded position. In ignoring the touch inputs, controller 1210 delays activating the front display in response to determining that the pivot position is transitioning from the fully folded position to the intermediate pivot position. Controller 1210 deactivates the front display in response to determining that the pivot position is transitioning from the intermediate pivot position to the fully folded position. In one or more embodiments, the at least one display includes back display(s) 1209*a*-1209*b*, exposed on an outer side of one or both of first housing 1203*a* and second housing 1203*b*.

Figure 18:
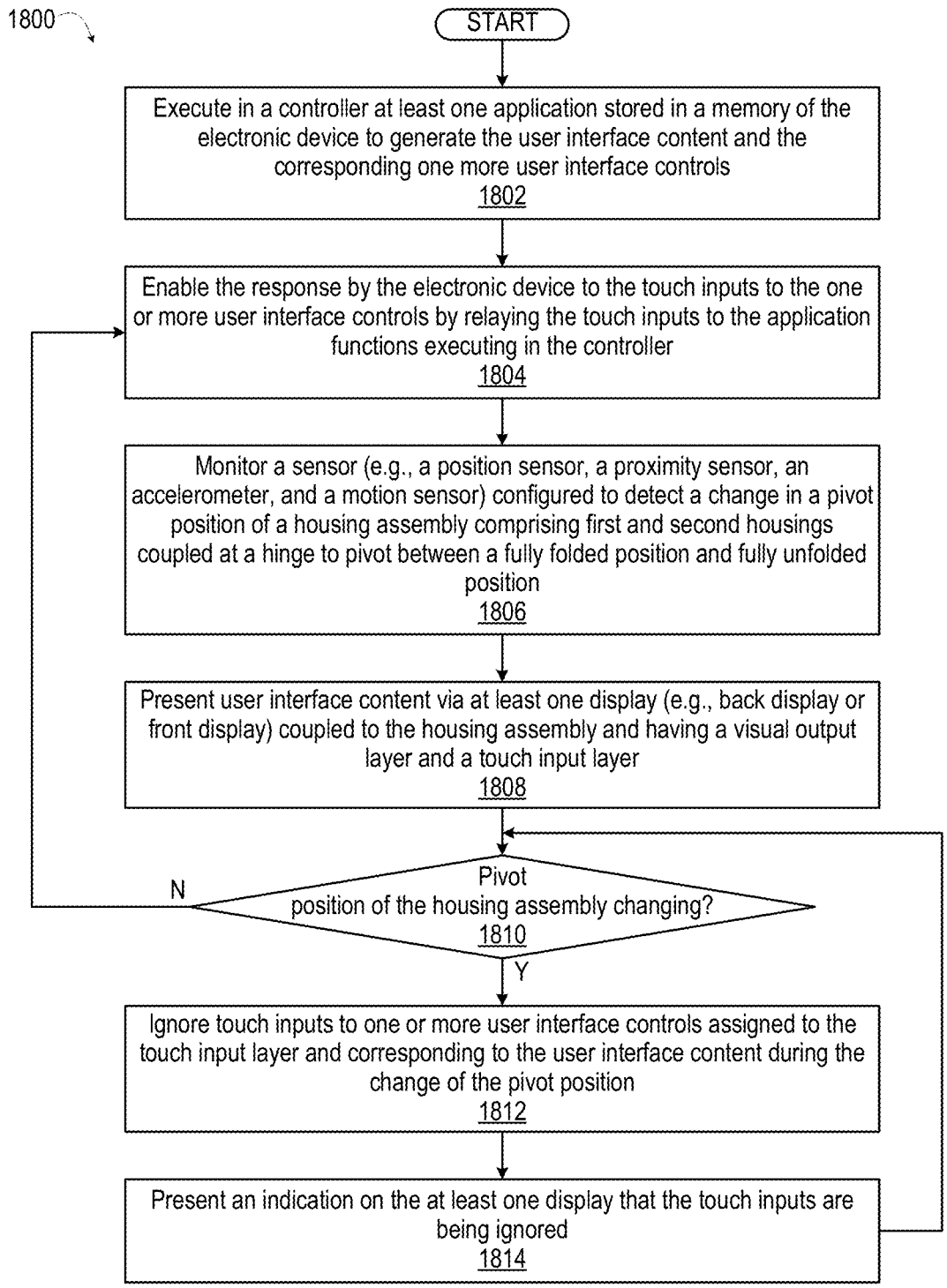
FIG. 18 is a flow diagram presenting a method of providing a user interface on at least one display of an electronic device having a foldable form factor during pivoting of a display housing assembly about a hinge, according to one or more embodiments.
Figure 19:
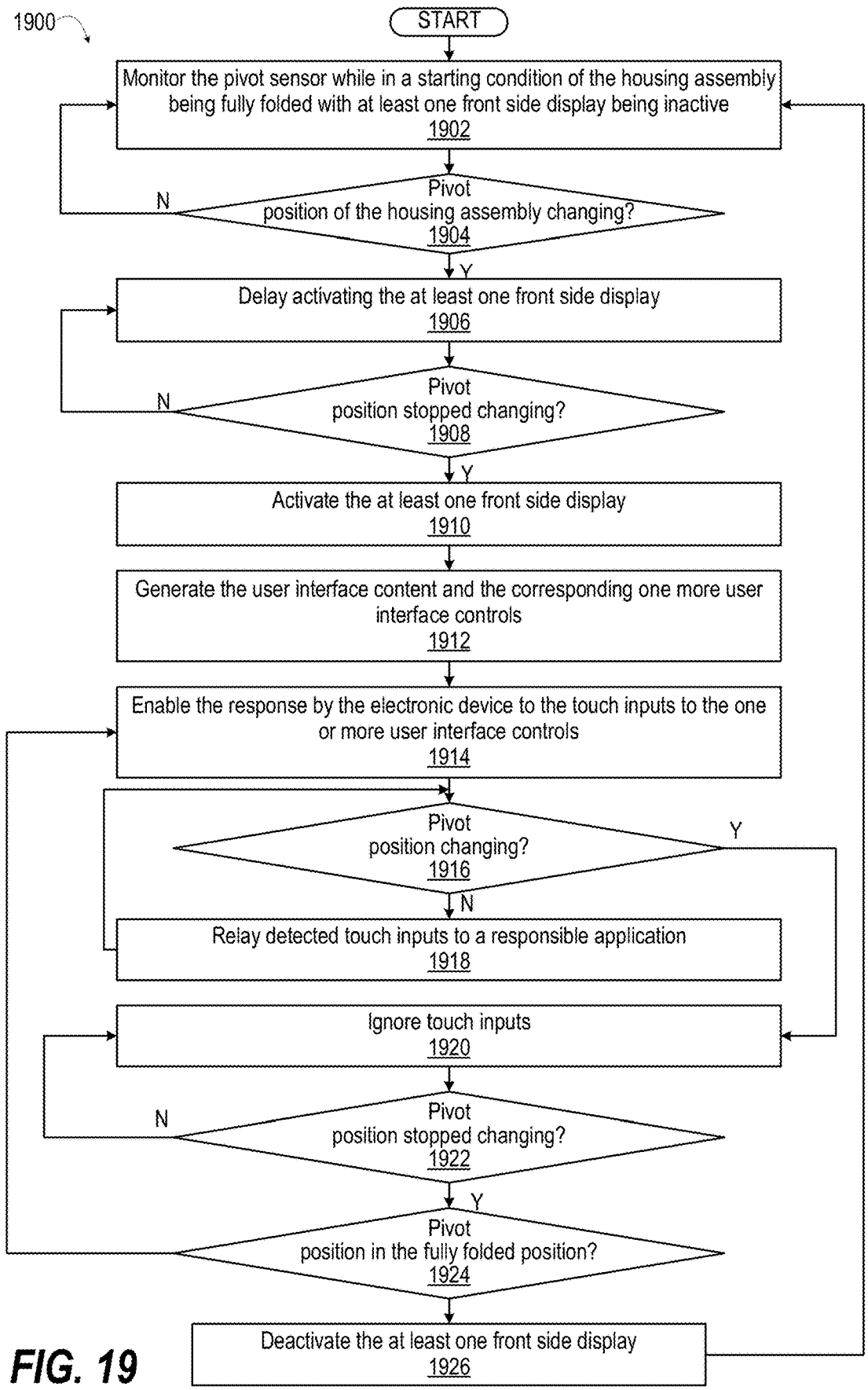
FIG. 19 is a flow diagram presenting a method of managing presentation of a user interface at flexible display on front sides of a housing assembly that folds and unfolds, according to one or more embodiments.

FIG. 18 is a flow diagram of a method of mitigating inadvertent touch activations at a display of an electronic device having a foldable form factor. FIG. 19 is a flow diagram presenting a method of managing presentation of a user interface at flexible display on front sides of a housing assembly that folds and unfolds. The descriptions of method 1800 (FIG. 18) and method 1900 (FIG. 19) are provided with general reference to the specific components illustrated within the preceding FIGS. 12-17. Specific components referenced in method 1800 (FIG. 18) and method 1900 (FIG. 19) may be identical or similar to components of the same name used in describing preceding FIGS. 12-17. In one or more embodiments, controller 1210 (FIG. 12) configures electronic device 1201 (FIG. 12) to provide the described functionality of method 1800 (FIG. 18) and method 1900 (FIG. 19).

With reference to FIG. 18, method 1800 includes executing in a controller at least one application stored in a memory of the electronic device to generate the user interface content and the corresponding one more user interface controls (block 1802). Method 1800 includes enabling the response by the electronic device to the touch inputs to the one or more user interface controls by relaying the touch inputs to the application functions executing in the controller (blocks 1804). Method 1800 includes monitoring a sensor (e.g., a position sensor, a proximity sensor, an accelerometer, and a motion sensor) configured to detect a change in a pivot position of a housing assembly, which includes first and second housings coupled at a hinge to pivot between a fully folded position and fully unfolded position (block 1806). Method 1800 includes presenting user interface content via at least one display (e.g., back display or front display) coupled to the housing assembly and having a visual output layer and a touch input layer (block 1808). Method 1800 includes determining, based on input received from the sensor, whether the pivot position of the housing assembly is changing (decision block 1810). In response to determining, based on input received from the sensor, that the pivot position of the housing assembly is not changing at either an intermediate pivot position, a fully folded position, or a fully unfolded position, method 1800 returns to block 1804. In response to determining, based on input received from the sensor, that the pivot position of the housing assembly is changing, method 1800 includes ignoring, during the change of the pivot position, touch inputs to one or more user interface controls assigned to the touch input layer and corresponding to the user interface content (block 1812). Method 1800 includes presenting an indication on the at least one display that the touch inputs are being ignored (block 1814). Then method 1800 returns to block 1810.

With reference to FIG. 19, method 1900 includes monitoring the pivot sensor while in a starting condition of the housing assembly being fully folded with at least one front side display being inactive (block 1902). Method 1900 includes determining whether the pivot position of the housing assembly is changing (i.e., unfolding) (decision block 1904). In response to determining that the pivot position of the housing assembly is not changing, method returns to block 1902. In response to determining that the pivot position is changing, method 1900 includes delaying activating the at least one front side display (block 1906). Method 1900 includes determining whether the pivot position has stopped changing (decision block 1908). In response to determining that the pivot position has not stopped changing, method 1900 returns to block 1906. In response to determining that the pivot position has stopped changing, method 1900 includes activating the at least one front side display (block 1910). In one or more embodiments, activation of the at least one front side display further requires reaching a minimum unfolded position (e.g., tent acute angle, stand right angle, or planar fully unfolded). Method 1900 includes generating and presenting the user interface content and the corresponding one more user interface controls (block 1912). Method 1900 includes enabling response by the electronic device to the touch inputs to the one or more user interface controls (blocks 1914).

Method 1900 includes determining whether the pivot position is changing (e.g., further unfolding or folding) (decision block 1916). In response to determining that the pivot position of the housing assembly is not changing, method includes relaying detected touch inputs to an associated application (block 1918). Then, method 1900 returns to block 1916. In response to determining that the pivot position is changing, method 1900 includes ignoring touch inputs (block 1920). Method 1900 includes determining whether the pivot position has stopped changing (decision block 1922). In response to determining that the pivot position has not stopped changing, method 1900 returns to block 1920. In response to determining that the pivot position has stopped changing, method 1900 includes determining whether the pivot position is in the fully folded position (decision block 1924). In response to determining that the housing position is in the fully folded position, method 1900 includes deactivating the at least one front side display (block 1926). Then method 1900 returns to block 1902. In response to determining that the housing position is not in the fully folded position, method 1900 returns to block 1914.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a device housing having a front side and a back side;
a flexible display slidably coupled to the device housing and comprising a visual output layer and a touch input layer;
a translation mechanism operable to slide the flexible display relative to the device housing between a fully retracted position and a fully extended position; and
a controller communicatively coupled to the flexible display and the translation mechanism, and which:
  determines a first user interface having a first size that fits within a front portion of the flexible display on the device housing;
  presents user interface content in the first user interface on the visual output layer of the flexible display;
  monitors for at least one touch input to one or more user interface controls associated with user interface content at a corresponding area of the touch input layer; and
  in response to detecting activation of the translation mechanism to reposition the flexible display relative to the device housing:
    configures a second user interface having a second size that fits within the flexible display on the front side of the device housing after repositioning the flexible display;
    maintains presentation of the user interface content on the visual output layer in a smaller one of the first and the second user interface during repositioning of the flexible display; and
    maintains an association of one or more user interface controls at the touch input layer that correspond to the user interface content in the smaller one of the first and the second user interface during the repositioning of the flexible display to avoid refreshing of the user interface content and thereby mitigate inadvertent touch activation of a user interface control during the repositioning.

2. The electronic device of claim 1, wherein the controller:
in response to determining that the translation mechanism is repositioning the flexible display to a retracted position:
  determines the second size of the second user interface by identifying a retracting portion of the flexible display that will no longer be positioned on the front side of the device housing after the repositioning of the flexible display;
  removes one or more portions of the user interface content and each corresponding portion of user interface controls from the retracting portion of the flexible display concurrently with repositioning the flexible display to the retracted position; and
  integrates the one or more portions into the second user interface, which is sized to fit within a remaining portion of the flexible display visible on the front side of the electronic device.

3. The electronic device of claim 1, wherein the controller:
in response to determining that the translation mechanism is repositioning the flexible display to an extended position:
determines the second user interface having the second size by identifying an extending portion of the flexible display that is not positioned on the front side but becomes positioned on the front side of the device housing in the extended position; and
delays presenting one or more portions of user interface content and assigning corresponding one or more portion of user interface controls to the extending portion of the flexible display until the flexible display is repositioned to the extended position.

4. The electronic device of claim 1, wherein the controller:
determines a display refresh rate of the visual output layer;
determines a touch refresh rate of the touch input layer; and
maintains presentation of the user interface content on the visual output layer and maintains assignment of each user interface controls further in response to determining that the display refresh rate is slower than the touch refresh rate that results in a location offset during repositioning of the flexible display.

5. The electronic device of claim 1, wherein the flexible display comprises a blade assembly having a blade substrate that is slidably coupled to the device housing and moved by the translation mechanism, the visual output layer and the touch input layer being attached to move with the blade substrate, the blade assembly extending out from one end of the device housing while in an at least partially extended position.

6. The electronic device of claim 1, wherein the device housing comprises a telescoping structure positionable between the retracted and extended positions.

7. The electronic device of claim 1, further comprising a position sensor communicatively coupled to the controller and configured to detect a position of the flexible display, and wherein the controller:
receives animated user interface content and at least one corresponding animated user interface control intended to change position on the flexible display as a function of time;
buffers a location on the device housing and time of presentation of the animated interface content while repositioning the flexible display based on the position sensor; and
in response to receiving a touch input from the visual input layer of the flexible display while the flexible display is translating:
determines whether a location on the touch input layer and time of a touch input corresponds to a buffered location on the device housing and time of the presentation of the animated user content; and
associates the touch input to a corresponding animated user control in response to the determining that the location on the touch input layer and the time of the touch input correspondent to the buffered location on the device housing and time of presentation of the animated user content.

8. The electronic device of claim 7, wherein in associating the touch input to the corresponding animated user control, the controller:
identifies a time delay based on a human reaction time value; and
determines whether the location on the touch input layer and the time of the touch input adjusted by the time delay corresponds to the buffered location on the device housing and the time of the presentation of the animated user content.

9. A method comprising:
monitoring a touch input layer of a flexible display slidably coupled to device housing and moved by a translation mechanism operable to slide the flexible display relative to the device housing between a fully retracted position and a fully extended position;
determining a first user interface size available at the flexible display on a front side of the device housing;
presenting user interface content in the first user interface on a visual output layer of the flexible display;
monitoring for at least one touch input to one or more user interface controls associated with user interface content at a corresponding portion of the touch input layer; and
in response to detecting activation of the translation mechanism to reposition the flexible display:
configuring a second user interface having a second size that fits at the flexible display on the front side of the device housing after repositioning the flexible display;
maintaining presentation of the user interface content on the visual output layer in a smaller one of the first and the second user interface during repositioning of the flexible display; and
maintaining association of one or more user interface controls at the touch input layer that correspond to the user interface content in the smaller one of the first and the second user interface during the repositioning of the flexible display to avoid refreshing of the user interface content and thereby to mitigate inadvertent touch activation of a user interface control.

10. The method of claim 9, further comprising:
in response to determining that the translation mechanism is repositioning the flexible display to a retracted position:
determining the second user interface having the second size by identifying a retracting portion of the flexible display that will no longer be positioned on the front side of the device housing after the repositioning of the flexible display; and
removing one or more portions of the user interface content and each corresponding portion of user interface controls from the retracting portion of the flexible display prior to repositioning the flexible display to the retracted position.

11. The method of claim 9, further comprising:
in response to determining that the translation mechanism is repositioning the flexible display to an extended position:
determining the second user interface having the second size by identifying an extending portion of the flexible display that is not positioned on the front side but becomes positioned on the front side of the device housing in the extended position; and
delaying presenting one or more portions of user interface content and assigning corresponding one or more portion of user interface controls to the extending portion of the flexible display until the flexible display is repositioned to the extended position.

12. The method of claim 9, further comprising:
determining a display refresh rate of the visual output layer;
determining a touch refresh rate of the touch input layer; and
maintaining presentation of the user interface content on the visual output layer and maintains assignment of each user interface controls further in response to determining that the display refresh rate is slower than the touch refresh rate that results in a location offset during repositioning of the flexible display.

13. The method of claim 9, wherein the flexible display comprises a blade assembly having a blade substrate that is slidably coupled to the device housing and moved by the translation mechanism, the visual output layer and the touch input layer being attached to move with the blade substrate, the blade assembly extending out from one end of the device housing while in an at least partially extended position.

14. The method of claim 9, wherein the device housing comprises a telescoping structure positionable between the retracted and extended positions.

15. The method of claim 9, further comprising:
monitoring a position sensor configured to detect a position of the flexible display;
receiving animated user interface content and at least one corresponding animated user interface control intended to change position on the flexible display as a function of time;
buffering a location on the device housing and time of presentation of the animated interface content while repositioning the flexible display based on the position sensor; and
in response to receiving a touch input from the visual input layer of the flexible display while the flexible display is translating:
determining whether a location on the touch input layer and time of a touch input corresponds to a buffered location on the device housing and time of the presentation of the animated user content; and
associating the touch input to a corresponding animated user control in response to the determining that the location on the touch input layer and the time of the touch input correspondent to the buffered location on the device housing and time of the presentation of the animated user content.

16. The method of claim 15, wherein associating the touch input to the corresponding animated user control further comprises:
identifying a time delay based on a human reaction time value; and
determining whether the location on the touch input layer and the time of the touch input adjusted by the time delay corresponds to the buffered location on the device housing and the time of the presentation of the animated user content.

17. A computer program product comprising:
a computer readable storage device; and
program code on the computer readable storage device that when executed by a processor associated with an electronic device, the program code enables the electronic device to provide functionality of:
monitoring a touch input layer of a flexible display slidably coupled to device housing and moved by a translation mechanism operable to slide the flexible display relative to the device housing between a fully retracted position and a fully extended position;
determining a first user interface size available at the flexible display on a front side of the device housing;
presenting user interface content in the first user interface on a visual output layer of the flexible display;
monitoring for at least one touch input to one or more user interface controls associated with user interface content at a corresponding portion of the touch input layer; and
in response to detecting activation of the translation mechanism to reposition the flexible display:
configuring a second user interface having a second size that fits at the flexible display on the front side of the device housing after repositioning the flexible display;
maintaining presentation of the user interface content on the visual output layer in a smaller one of the first and the second user interface during repositioning of the flexible display; and
maintaining association of one or more user interface controls at the touch input layer that correspond to the user interface content in the smaller one of the first and the second user interface during the repositioning of the flexible display to avoid refreshing of the user interface content and thereby to mitigate inadvertent touch activation of a user interface control.

18. The computer program product of claim 17, wherein the program code enables the electronic device to provide functionality of:
in response to determining that the translation mechanism is repositioning the flexible display to a retracted position:
determining the second user interface having the second size by identifying a retracting portion of the flexible display that will no longer be positioned on the front side of the device housing after the repositioning of the flexible display; and
removing one or more portions of the user interface content and each corresponding portion of user interface controls from the retracting portion of the flexible display prior to repositioning the flexible display to the retracted position.

19. The computer program product of claim 17, wherein the program code enables the electronic device to provide functionality of:
in response to determining that the translation mechanism is repositioning the flexible display to an extended position:
determining the second user interface having the second size by identifying an extending portion of the flexible display that is not positioned on the front side but becomes positioned on the front side of the device housing in the extended position; and
delaying presenting one or more portions of user interface content and assigning corresponding one or more portion of user interface controls to the extending portion of the flexible display until the flexible display is repositioned to the extended position.

20. The computer program product of claim 17, wherein the program code enables the electronic device to provide functionality of:
determining a display refresh rate of the visual output layer;
determining a touch refresh rate of the touch input layer; and
maintaining presentation of the user interface content on the visual output layer and maintains assignment of each user interface controls further in response to determining that the display refresh rate is slower than the touch refresh rate that results in a location offset during repositioning of the flexible display.

* * * * *